United States Patent
Moser

(10) Patent No.: US 7,054,394 B2
(45) Date of Patent: May 30, 2006

(54) DOPPLER SHIFT AND SPREAD ESTIMATION METHOD AND APPARATUS

(75) Inventor: Mario Moser, Bonn (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/504,450

(22) PCT Filed: Feb. 18, 2002

(86) PCT No.: PCT/EP02/01703

§ 371 (c)(1), (2), (4) Date: Mar. 10, 2005

(87) PCT Pub. No.: WO03/077445

PCT Pub. Date: Sep. 18, 2003

(65) Prior Publication Data

US 2005/0159928 A1   Jul. 21, 2005

(51) Int. Cl.
H04L 27/06  (2006.01)

(52) U.S. Cl. .................................. 375/343; 375/346

(58) Field of Classification Search ............... 375/130, 375/148–150, 224, 343, 346; 342/25 F, 342/99, 171, 357.05, 418; 367/90, 94
See application file for complete search history.

(56) References Cited

U.S. PATENT DOCUMENTS

| 4,583,409 A | 4/1986 | Lannuzel et al. | |
| 6,563,861 B1 * | 5/2003 | Krasny et al. | 375/150 |
| 6,680,969 B1 * | 1/2004 | Molnar et al. | 375/224 |
| 6,922,452 B1 * | 7/2005 | Sandberg | 375/346 |

FOREIGN PATENT DOCUMENTS

| JP | 11234190 A | 8/1999 |
| WO | WO 0113537 A | 2/2001 |

OTHER PUBLICATIONS

Tepedelenlioglue C et al; "Estimation of Doppler spread and signal strength in mobile communications with applications to handoff and adaptive transmission", Wireless Communications and Mobile Computing, Apr.-Jun. 2001, Wiley, UK Online, vol. 1, No. 2, pp. 221-242 XP002197939, ISSN: 1530-8669, Retrieved from Internet: URL: http://www.eas.asu.edu/cihan/MYPAPERS/fulltext.pdf> retrieved on May 2, 2002.
Patent Abstracts of Japan, vol. 1999, No. 13, Nov. 30, 1999.
European Patent Office, International Search Report for PCT/EP02/01703, dated May 2, 2002.

* cited by examiner

*Primary Examiner*—Don N. Vo
(74) *Attorney, Agent, or Firm*—Roger Burleigh

(57) ABSTRACT

For a noise resistant estimation of a Doppler spread for a radio signal transmission channel in a mobile communications environment, the Doppler spread is estimated on the basis of an autocorrelation function for predefined signal portions of a received radio signal, such as pilot bits of signals transmitted via a control channel in a mobile telephone system. The received radio signal and in particular the predefined signal portions are demodulated to obtain discrete autocorrelation coefficients for the predefined signal portions. First and second derivatives of the autocorrelation function are estimated on the basis of at least two of the autocorrelation coefficients. In dependence of used autocorrelation coefficients, influence of noise included in the received radio signal can be at least reduced with respect to an estimation of the Doppler spread. Using the autocorrelation coefficients being indicative of the autocorrelation function and of the estimated first and second derivatives thereof, the Doppler spread can be estimated.

20 Claims, 13 Drawing Sheets

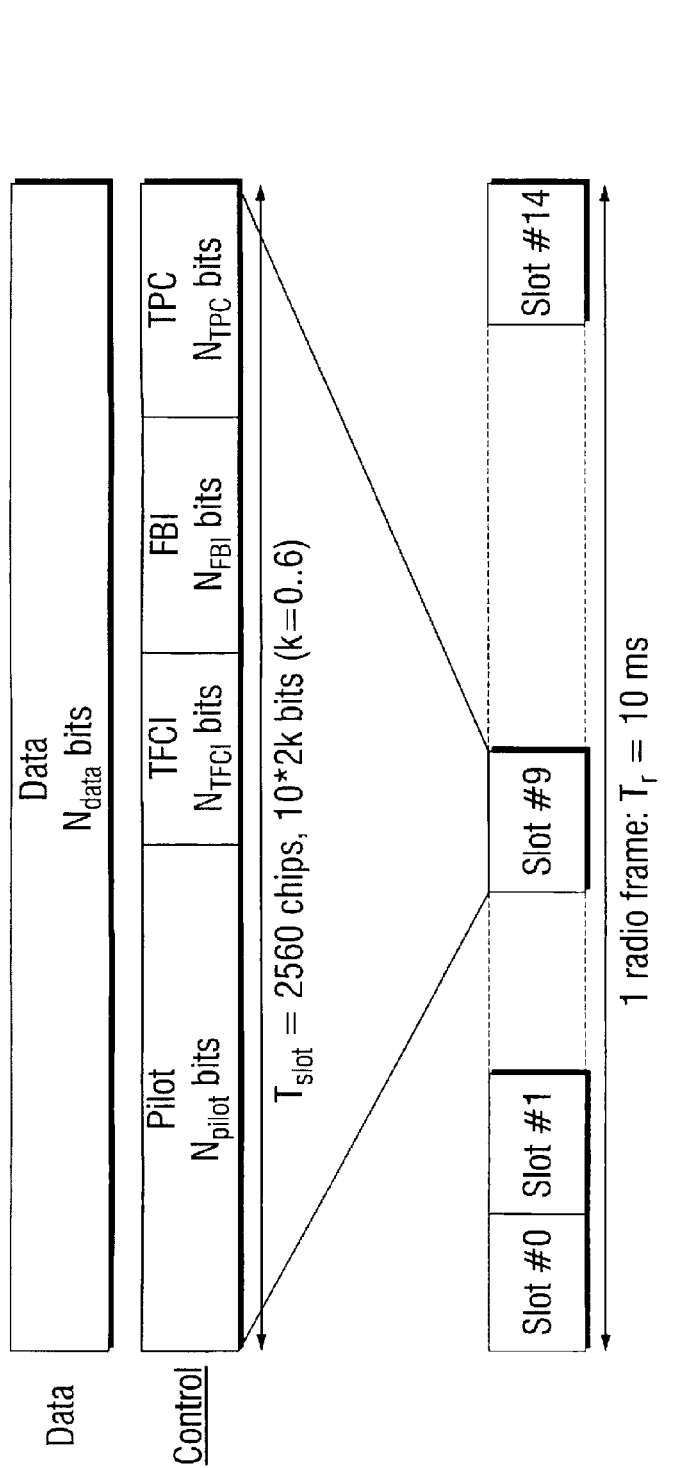

| $x^*(n)$ | $x^*(n+1)$ | $x^*(n+2)$ | $x^*(n+3)$ |
|---|---|---|---|
| $x(n+m)$ | $x(n+m+1)$ | $x(n+m+2)$ | $x(n+m+3)$ |

$x^*(n)x(n+m) + x^*(n+1)x(n+m+1) + x^*(n+2)x(n+m+2) + x^*(n+3)x(n+m+3) +$

| $x^*(n+4)$ | $x^*(n+5)$ | $x^*(n+6)$ |
|---|---|---|
| $x(n+m+4)$ | $x(n+m+5)$ | $x(n+m+6)$ |

DOPPLER SHIFT AND SPREAD ESTIMATION METHOD AND APPARATUS

FIELD OF THE INVENTION

The present invention relates to radio signal processing in mobile communications environments. In particular, the present invention relates to a method and apparatus for Doppler shift and spread estimations based on a correlation of demodulated pilot data of a radio signal transmitted in a mobile communications environment.

BACKGROUND OF THE INVENTION

Transmission of radio signals, e.g. employed in a mobile communications environment such as GSM and UTMS systems, are subjected to reflections, dispersions and the like such that a plurality of sub-radio signals are transmitted to a receiver from different directions. In dependence of the phases, the received sub-signals amplify or reduce each other. Thus, the resulting received signal is a function varying with the location of the receiver and, in case of a moving receiver, varying in time. Additionally, a movement of a transmitter results in a frequency shift of received signals due to the Doppler effect.

In order to compensate frequency shifts and spreads of received radio signals, the so-called Doppler shift and Doppler spread are used to estimate a frequency shift and frequency spread. The Doppler shift is indicative of a frequency offset which characterizes the difference in mean frequency between transmitted and received signals. The Doppler spread is indicative of a frequency spread which characterizes in a multipath propagation environment how fast the transmission channel used for radio signals is fading.

The Doppler shift which is also referred to as Doppler frequency $f_d$ can be computed by:

$$f_d = f_c \cdot \frac{v}{c} \tag{1}$$

wherein $f_c$ is the carrier frequency, v is the speed of a moving receiver (e.g. mobile user equipment such as a mobile telephone) and c is the speed of light.

Figure 1:
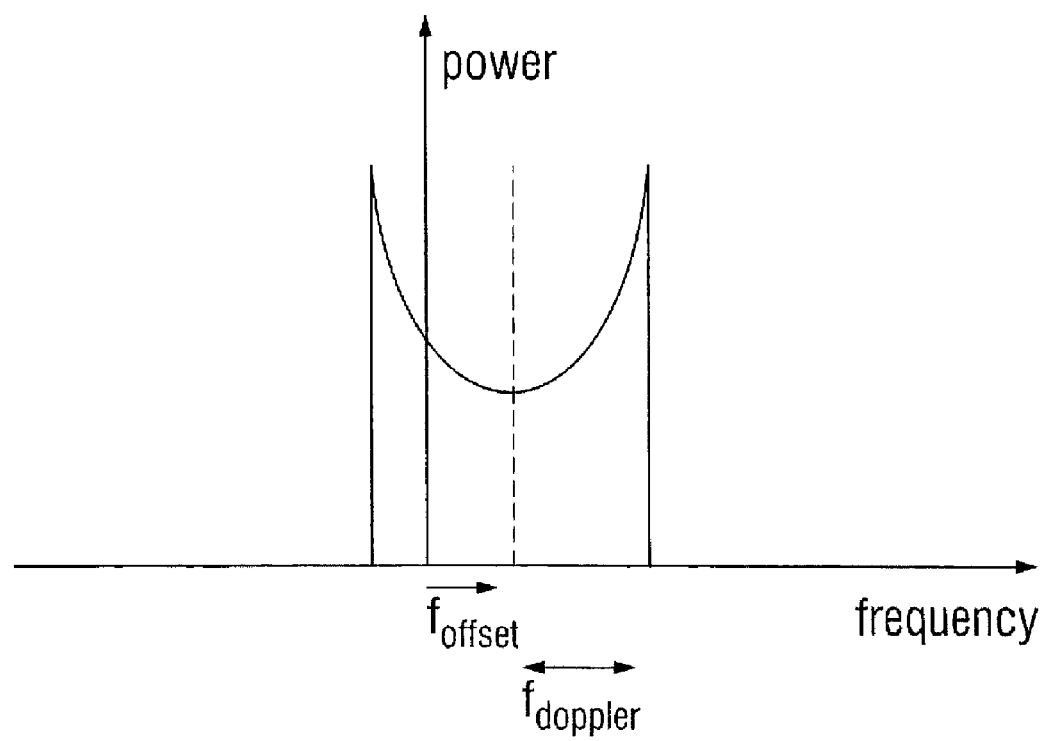

As shown in FIG. 1, the two channel parameters, frequency offset and Doppler shift, characterize a Doppler spectrum of a wireless radio signal communications channel.

A mobile radio signal communications channel can be characterized by a sequence of complex channel coefficients varying in time:

$$c(k) = Re\{c(k)\} + jIm\{c(k)\} \tag{2}$$

The channel coefficient sequence can be modeled as time discrete stationary random process wherein an autocorrelation sequence $r_{cc}(n)$ is defined as:

$$r_{cc}(n) = \lim_{K \to \infty} \frac{1}{2K+1} \sum_{k=-K}^{K} c^*(k)c(k+n) \tag{3}$$

Transforming the autocorrelation sequence $r_{cc}(n)$ in the frequency domain, the respective power density spectrum $\phi_{cc}(f)$ is given by:

$$\phi_{cc}(f) = \sum_{n=-\infty}^{\infty} \varphi_{cc}(n) e^{-2\pi j f T n} \tag{4}$$

which describes the spectral distribution of an unmodulated signal transmitted over a mobile radio signal communications channel c. This power density function is also called Doppler power density spectrum the shape thereof being dependent of the environment wherein a moving party transmits or receives a radio signal and of its speed of movement.

In order to predict the shape of a Doppler power density spectrum, short Doppler spectrum, different modelling methods are employed. For example, for modelling a Doppler spectrum it is assumed that a radio signal from or to a mobile entity by means of a radio signal channel having only one direct line of sight to the mobile entity. For this easiest case, the Doppler spectrum can be denoted by:

$$\phi_{cc}^d(f) = \delta(f - f_0) \tag{5}$$

wherein $\delta(f)$ denotes a dirac pulse. Here, the signal received by a mobile entity is simply shifted in frequency by a frequency offset.

A more complicated model assumes that radio signals are received or transmitted by a mobile entity by means of a channel for which no direct path is existing to the mobile entity. Thus, the resulting received signal comprises a superposition of signals received via indirect paths. In order to reduce the complexity of the calculation of a Doppler spectrum for the latter case, especially in case of a mobile radio signal communications environment, it is generally assumed that the propagation of signals takes place in a horizontal plane, that the angle of incidence is equally distributed in the range between 0 and $2\pi$ for all received signals and that the signal strengths for all signals via indirect paths are equally distributed. This assumption leads to the so-called Jake's spectrum which is given by:

$$\phi_{cc}^J(f) = \begin{cases} \dfrac{2\sigma_0^2}{\pi f_{max} \sqrt{1 - (f/f_{max})^2}}, & |f| \le f_{max} \\ 0, & |f| > f_{max} \end{cases} \tag{6}$$

On the basis of a Doppler spectrum according to equation (6), a Doppler frequency estimation method was proposed wherein, after a frequency offset compensation, an autocorrelation function for the Doppler spectrum is calculated, the autocorrelation function is expressed by a zero-order Bessel function of the first kind and the first-zero crossing of the autocorrelation function is determined. Further, this approach is performed on the basis of the slot rate used for the radio signals, wherein a slot is a duration which consists of fields containing information, e.g. bits. In particular, the slot rate based approach calculates a complex correlation function between so-called pilot bits or groups which usually serve as training signals. For obtaining an autocorrelation function, the sampling period is required to be much smaller than the inverse of the highest frequency expected in the Doppler spectrum. For example, the slot rate in an UMTS system is 1.500 Hz. Thus, it is impossible to perform a Doppler spread estimation on slot rate basis for frequencies above 750 Hz in an UMTS system.

Further, a Doppler spectrum according to equation (6) cannot be assumed under all circumstances depending on the communications environment, for example in rural areas compared with urban areas. Rather, Doppler spectra actually found in communications environments can be Gaussian distributed due to radio signal reflections and dispersions, can be defined by a dirac pulse due to a radio signal received via a channel having only one direct line of sight, can be result from a superposition of different distributions and combinations thereof.

For example, the above mentioned autocorrelation based approach using a Doppler spectrum according to equation (6) provides for ineffective Doppler spread estimation in case a line of direct sight component of received radio signals influences the resulting Doppler spectrum, e.g. by introducing a Doppler spectrum peak.

Object of the Invention

The object of the present invention is to overcome the above mentioned problems and in particular to provide a solution for a Doppler spread estimation when the autocorrelation function of a Doppler spread deviates from a Bessel function due to the existence of a line of sight component.

Solution According to the Invention

The present invention teaches to use a definition for the Doppler spread of a received radio signal in the time domain. In particular, a Doppler spread definition is used wherein the Doppler spread is characterized by a function in-time of an autocorrelation function of a received radio signal and the first and second derivatives of the autocorrelation function.

For an estimation of the Doppler spread of a radio signal on the basis of such a definition, the basic idea underlying the present invention is to estimate the first and second derivatives of the autocorrelation function determined for the radio signal for a predefined point of time.

For an determination of the autocorrelation function and its first and second derivatives, an autocorrelation sequence is defined for the radio signal by modeling the signal as a time discrete signal. In particular, the autocorrelation sequence is determined for known signal portions of the received radio signal such as training sequence signals or so-called pilot symbols.

On the basis of discrete autocorrelation coefficients for the autocorrelation sequence, the first and second derivatives of the autocorrelation function are estimated. In order to reduce or eliminate disturbances of the radio signal due to signal noise, it is contemplated to employ specific autocorrelation coefficients for the estimation of the first and second derivatives.

For estimating the Doppler spread, the values for the autocorrelation function obtained from the autocorrelation coefficients and the estimations based thereon are used to evaluate the Doppler spread definition.

With respect to a mobile telephone system, such as a GSM or UTMS environment, the basic idea underlying the present invention can be defined as a calculation or estimation of Doppler spread for radio signals transmitted according to the respective communications standards on the basis of an autocorrelation function of received and demodulated training or pilot signal of a control channel.

Short Description of the Invention

In a greater detail, the present invention provides a method for Doppler spread estimation for a radio signal transmission channel in a mobile communications environment on the basis of a radio signal transmitted via the transmission channel. For carrying out the method according to the invention an autocorrelation function for the radio signal is determined and a Doppler spread for the radio signal is defined as a function in time of the autocorrelation function and its first and second derivatives for a point of time being zero. While the autocorrelation function for the point of time being zero is determined, the first and second derivates of the autocorrelation function are estimated for the point of time being zero. In particular, this estimations are obtained by an averaging of respective portions of the autocorrelation function each thereof including the point of time being zero. The determined and estimated values for the autocorrelation function are used to compute the defined Doppler spread function whereby an estimated value for the Doppler spread is obtained.

For the determination of the autocorrelation function it is possible to model the radio signal as a time discrete signal and to determine an autocorrelation sequence for the time discrete signal representing the transmitted radio signal.

For the determination and estimation of values of the autocorrelation function it is possible to calculate autocorrelation coefficients for the autocorrelation sequence. Optionally it is contemplated to define a correlation influence length and to determine autocorrelation sequence coefficients by means of a recursive function.

For obtaining the recursive function used for the determination of autocorrelation sequence coefficients, a linear or an exponential averaging of the autocorrelation sequence is possible.

An estimation of the first and second derivatives of the autocorrelation function can be provided by determining respective slopes of the autocorrelation function wherein the estimation for the second derivatives of the autocorrelation function which can be considered as a respective slope of the first derivative of the autocorrelation function can also be calculated on the basis of slopes of the autocorrelation function itself.

In the case of an autocorrelation sequence, slopes of the autocorrelation function can be determined by averaging processes for respective autocorrelation coefficients. In particular, two autocorrelation coefficients for points of time, which define a time interval including the point of time (t=0) for which the first and second derivatives of the autocorrelation function are to be estimated, are chosen. By means of a linear averaging of two autocorrelation coefficients chosen in this manner the slopes of the autocorrelation function are respectively determined. Preferably the determination of each slope of the autocorrelation function is performed such that only two values of the autocorrelation function are necessary to estimate the first and second derivatives thereof. As a result, the estimation of the Doppler spread for the transmission channel can be performed on the basis of only two values for the autocorrelation function defined for the radio signal.

In order to reduce disturbances of the radio signal due to signal noise possible leading to an estimation error for the Doppler spread, it is contemplated to only use such portions of the autocorrelation function for the estimation of the first and second derivatives thereof which are not affected by signal noise.

Especially such a noise resistant estimation of the Doppler spread can be accomplished if values for the autocorrelation function are employed which do not include autocorrelation function values for the point of time being zero. Further, it is possible to use single, discrete autocorrelation coefficients forming parts of the autocorrelation sequence to estimate the first and second derivatives of the autocorrelation function.

In particular, such a procedure is preferred in the case of modeling the radio signal as a time discrete signal.

Using discrete autocorrelation coefficients for the estimation of the first and second derivatives of the autocorrelation function, only two autocorrelation coefficients can be utilized wherein it is possible to determine at least one of the used autocorrelation coefficients in dependence of the correlation influence length defined for the autocorrelation function of the autocorrelation sequence, respectively.

Further optimization for the estimation of the Doppler spread can be obtained by evaluating the signal to noise ratio expected for the estimated second derivative of the autocorrelation function. In view of a threshold value defined for a signal to noise ratio, the signal to noise ratio for the estimated second derivative of the autocorrelation function is determined for different autocorrelation coefficients of the autocorrelation sequence. In the case no autocorrelation coefficients leads to a signal to noise ratio for the estimated second derivative of the autocorrelation function below the predefined signal to noise ratio threshold value, the Doppler spread is estimated to be zero. The same estimation for the Doppler spread can result if further constraints are defined in dependence of the autocorrelation coefficients with respect to the estimated second derivative of the autocorrelation function. An estimation of the Doppler spread as described above can be performed if, in particular, the signal to noise ratio for the estimated second derivative of the autocorrelation function exceeds the defined signal to noise ratio threshold value for a specific autocorrelation coefficient. Then, this autocorrelation coefficient is used for the estimation of the second derivative of the autocorrelation function.

In dependence of the manner the radio signal is transmitted via the transmission channel, it is possible, after having received the radio signal, to demodulate the received radio signal in particular in view of a predefined signal sequence included in the radio signal. Here, the autocorrelation function is determined as an autocorrelation function for the demodulated radio signal.

In a similar manner as described above, it is possible to define an autocorrelation sequence for the demodulated radio signal.

Especially in the case the radio signal includes, beside the predefined signal sequence, further signal portions it is contemplated to define the autocorrelation sequence and, in particular, the autocorrelation sequence for demodulated radio signal portions being indicative of the predefined signal sequence. This can be accomplished by means of a recursive function defining a relation between autocorrelation coefficients of the autocorrelation sequence. Such a recursive determination of autocorrelation coefficients can include averaging processes for the autocorrelation sequence, in particular in view of the percentage of the predefined signal sequence portion in the demodulated radio signal.

As a preferred embodiment, the present invention is utilized in a mobile telephone environment such as a GSM or UTMS system. Here, the transmission channel for which the Doppler spread is to be estimated can be a control channel such as a DPCCH channel. According to the standards of such mobile telephone environments, the radio signal used for a Doppler spread estimation comprises at least one frame having subsequent slots each thereof including a number of predefined pilot symbols. In this case, the predefined pilot symbols represent the above predefined signal sequence. By demodulating the radio signal it is possible to obtain the demodulated pilot symbols per slot for which autocorrelation coefficients can be determined. On the basis of the autocorrelation coefficients obtained for the demodulated pilot symbols, the first and second derivatives of the autocorrelation function can be estimated which are, in turn, used to estimate the Doppler spread.

Further, the present invention provides a computer program product for carrying out the above described methods and a receiver for a mobile communications environment being adapted to incorporate the above described methods.

SHORT DESCRIPTION OF THE FIGURES

Figure 2:
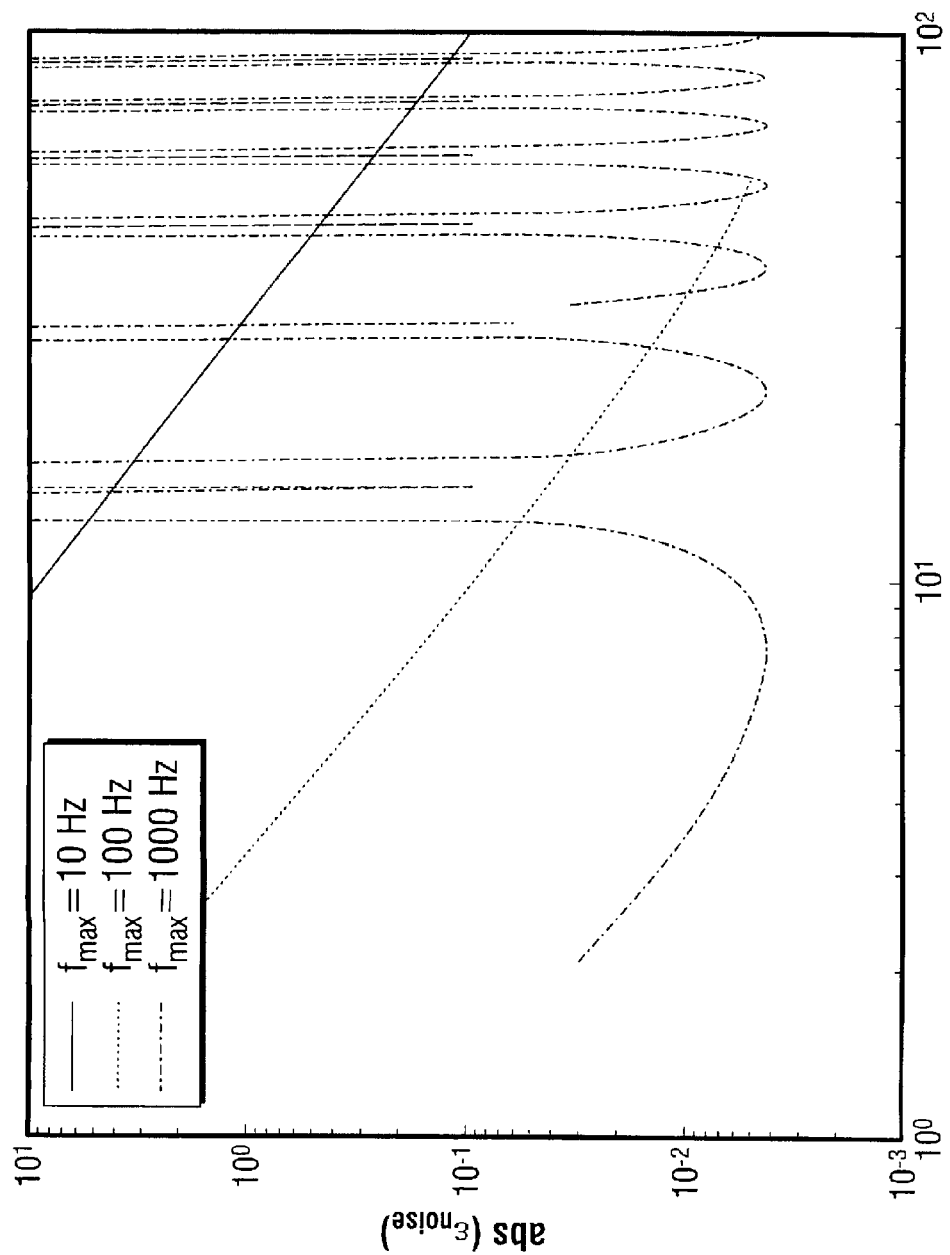
Figure 3:
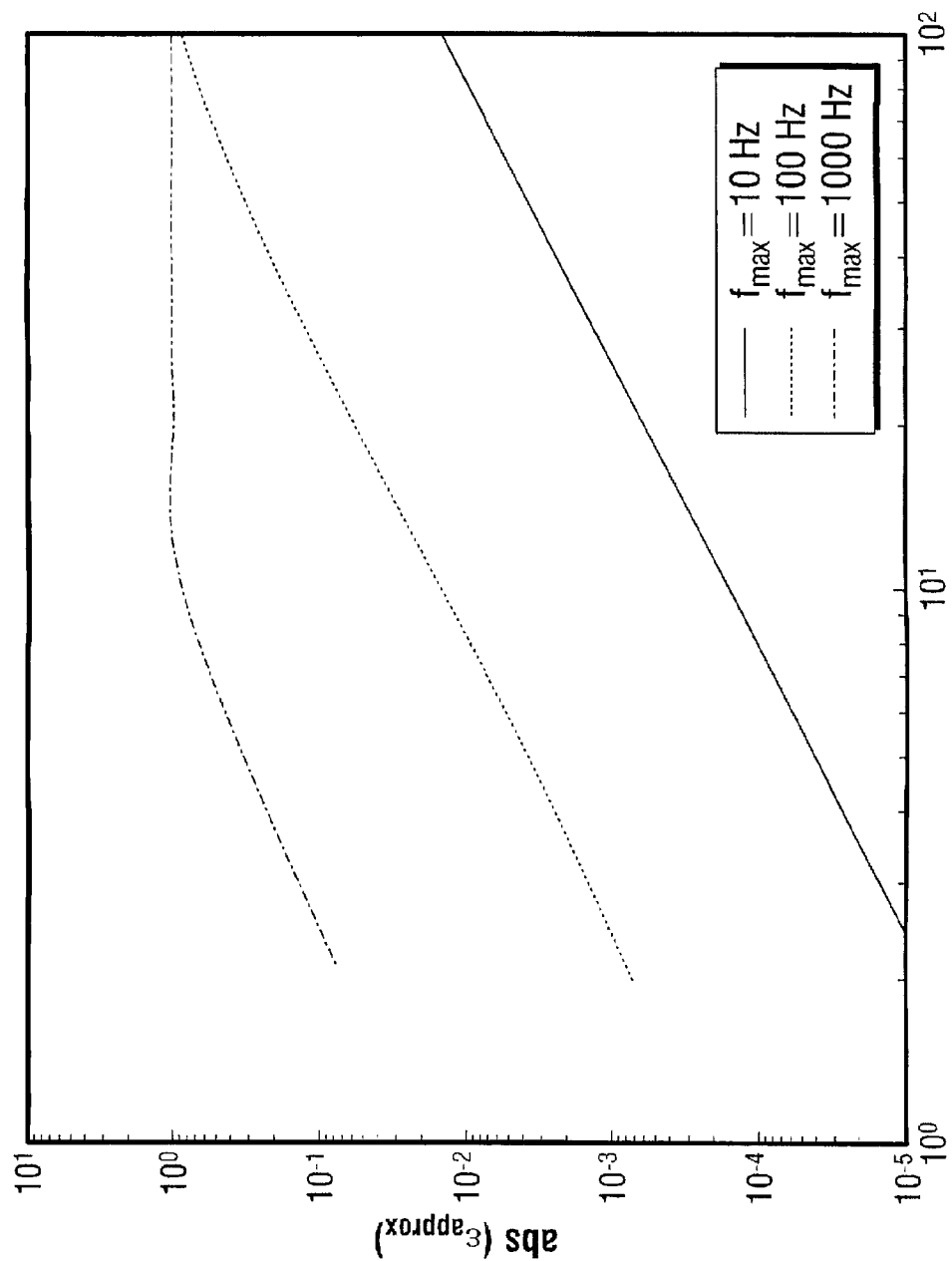
Figure 4:
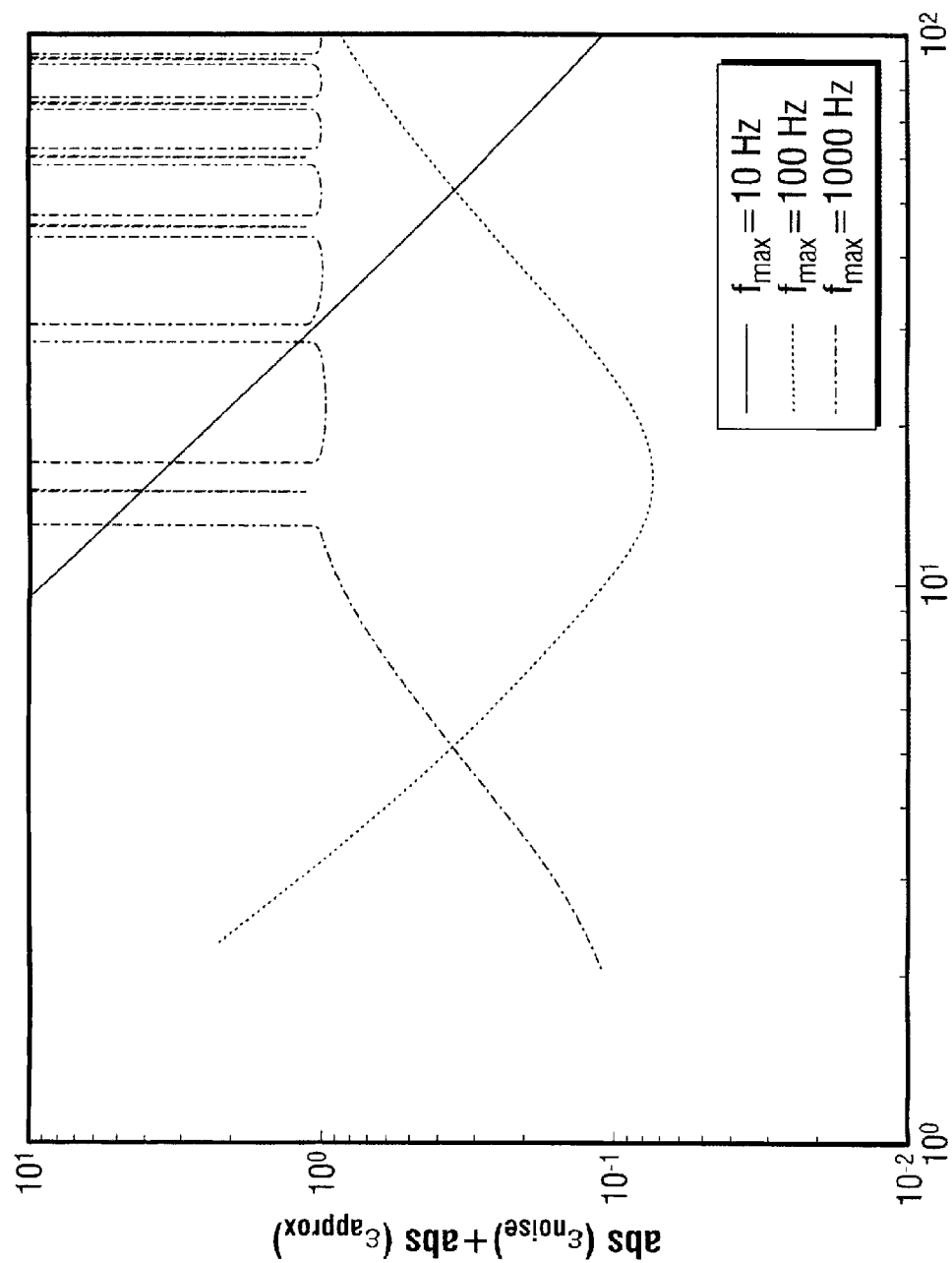
Figure 9:
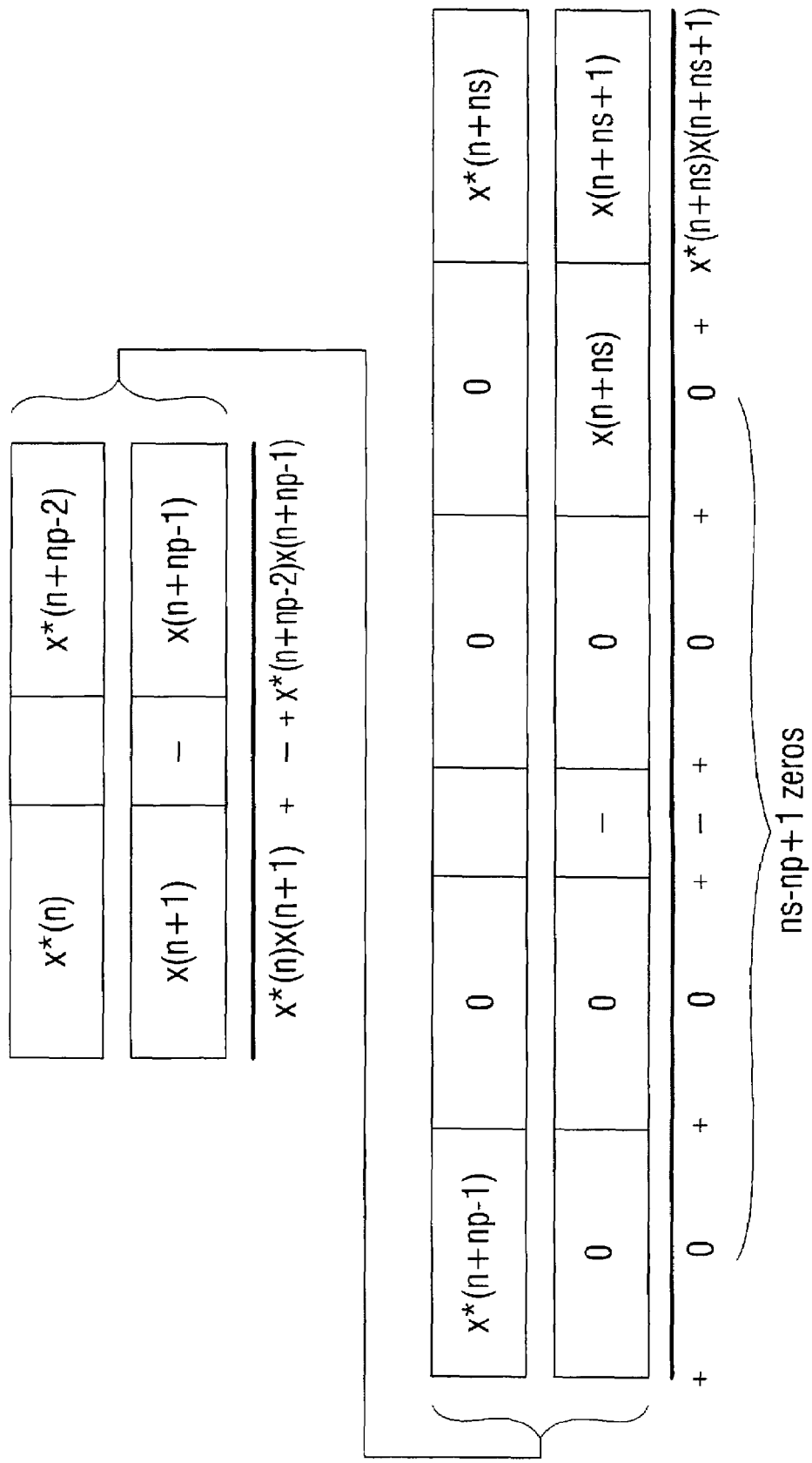
Figure 10A:
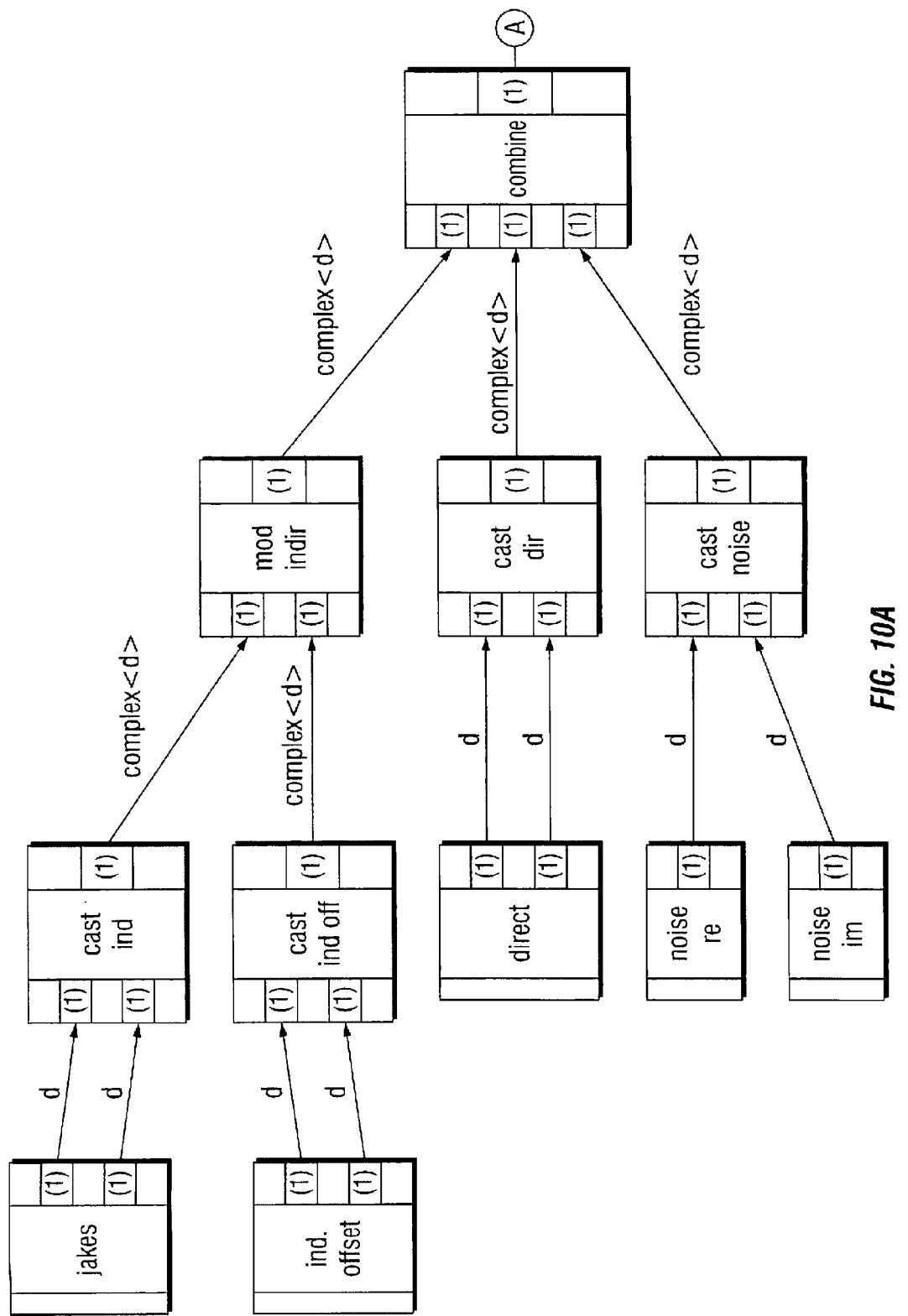
Figure 10B:
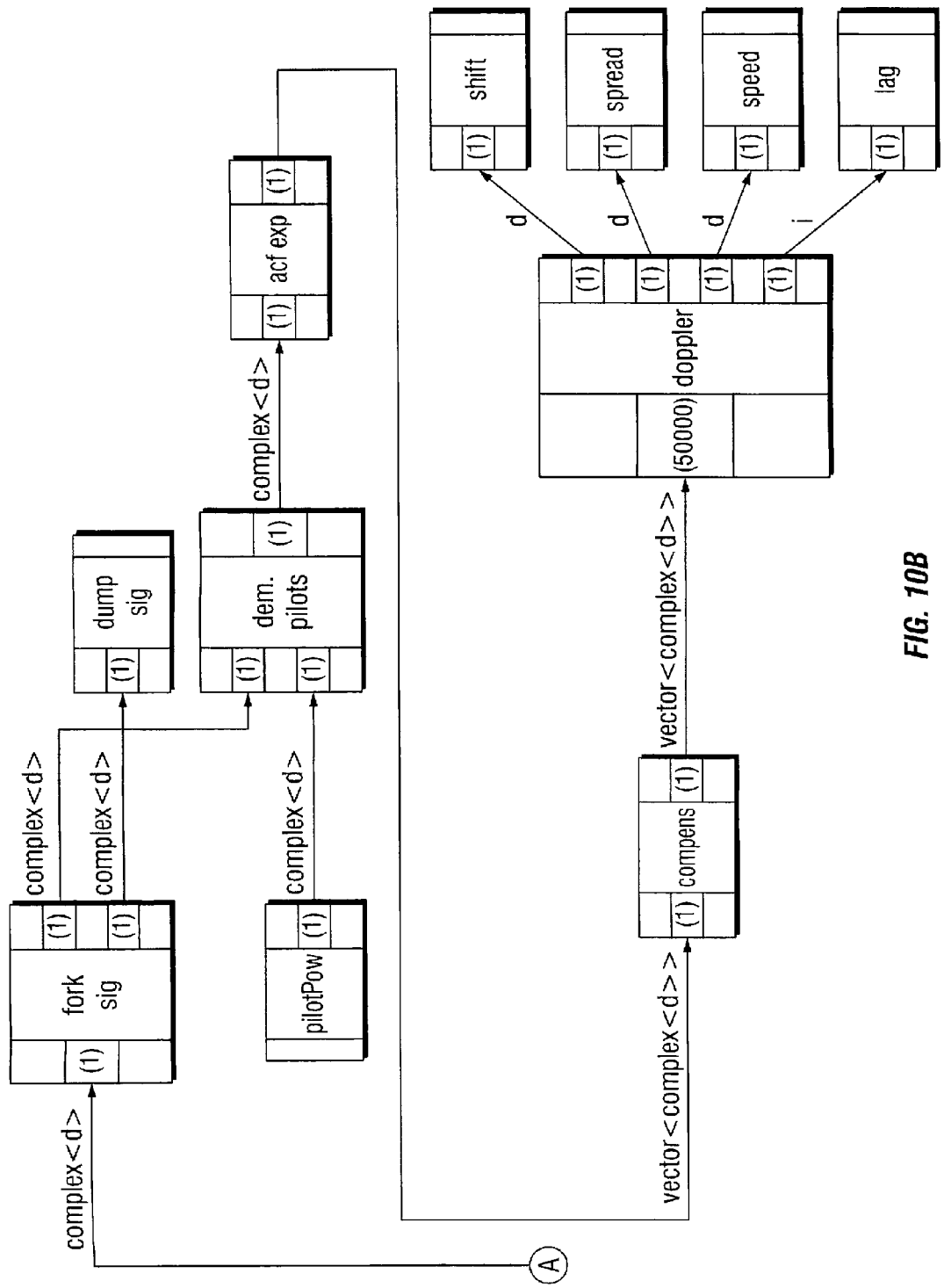
Figure 11A:
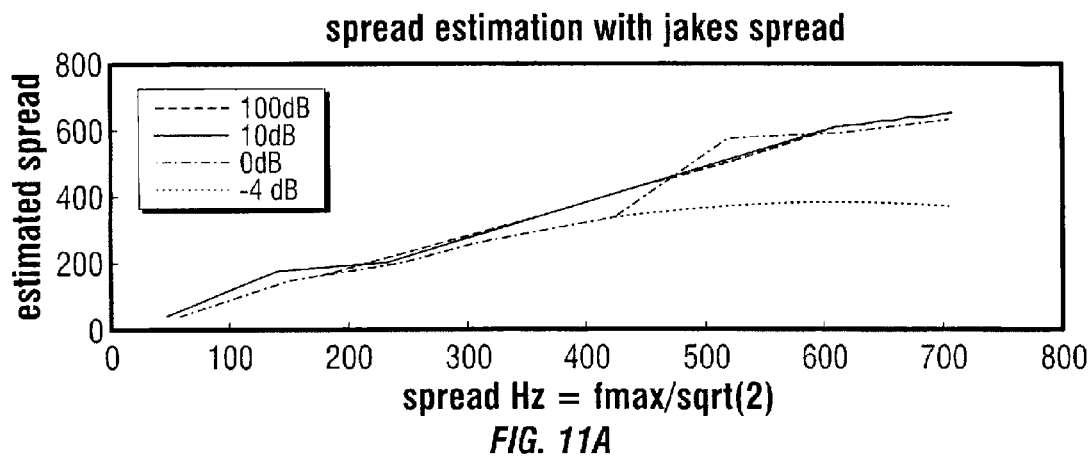
Figure 11B:
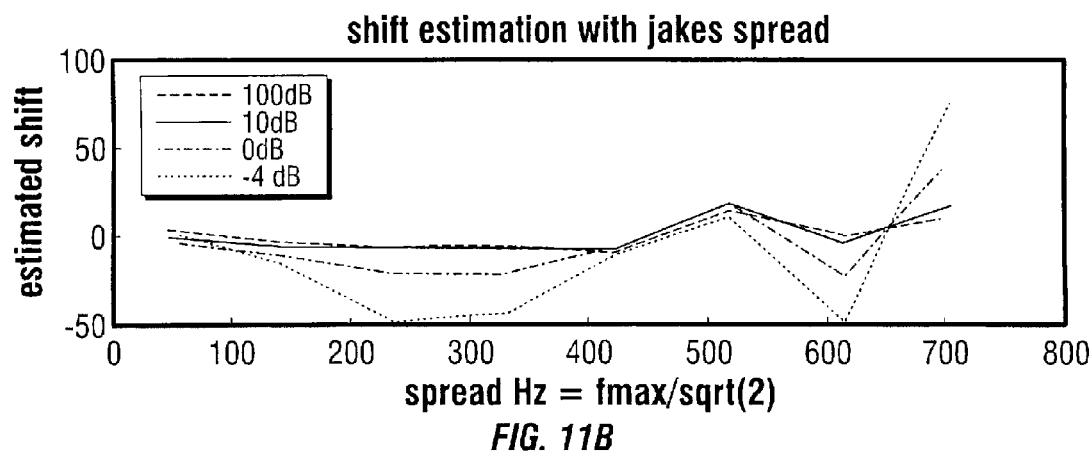
Figure 11C:
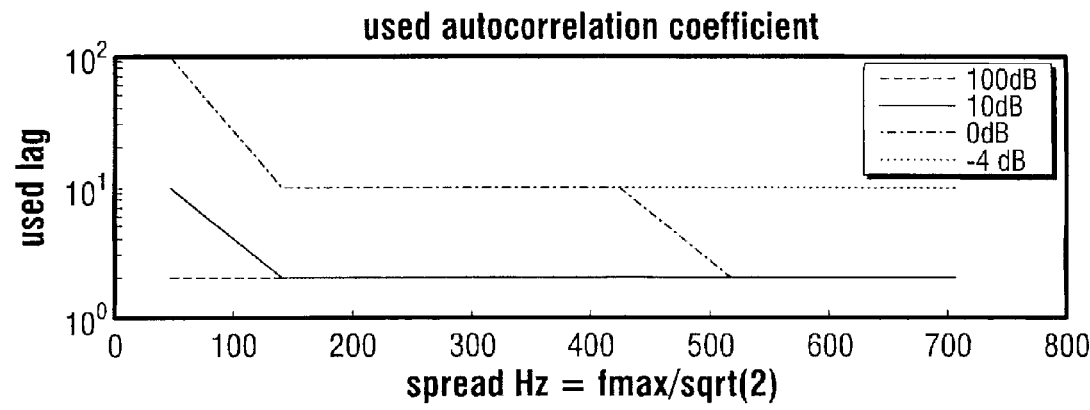
Figure 12A:
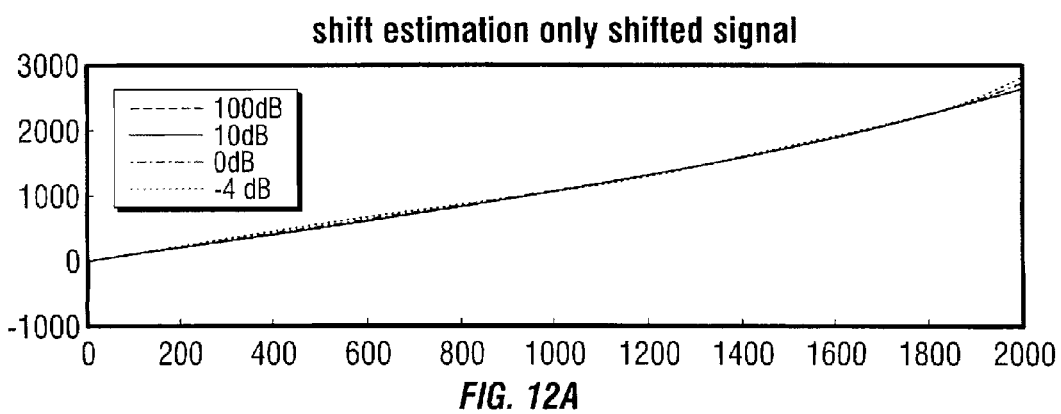
Figure 12B:
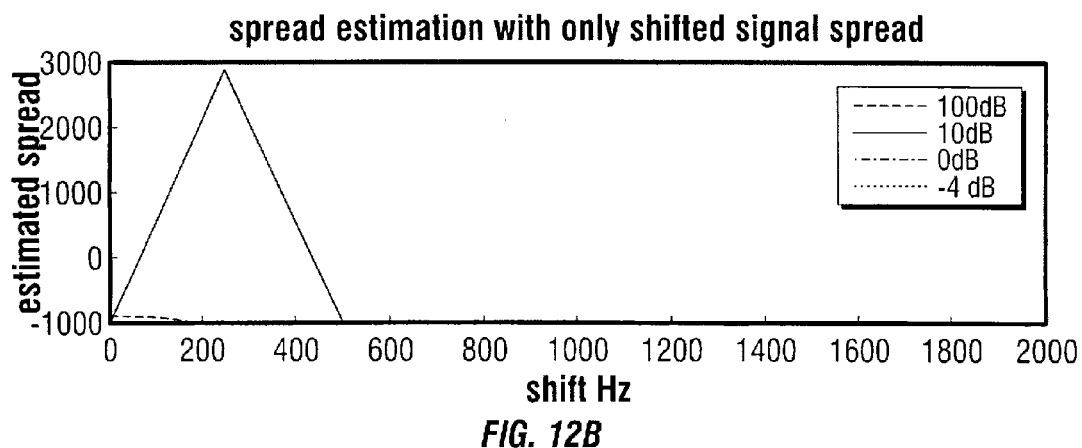
Figure 12C:
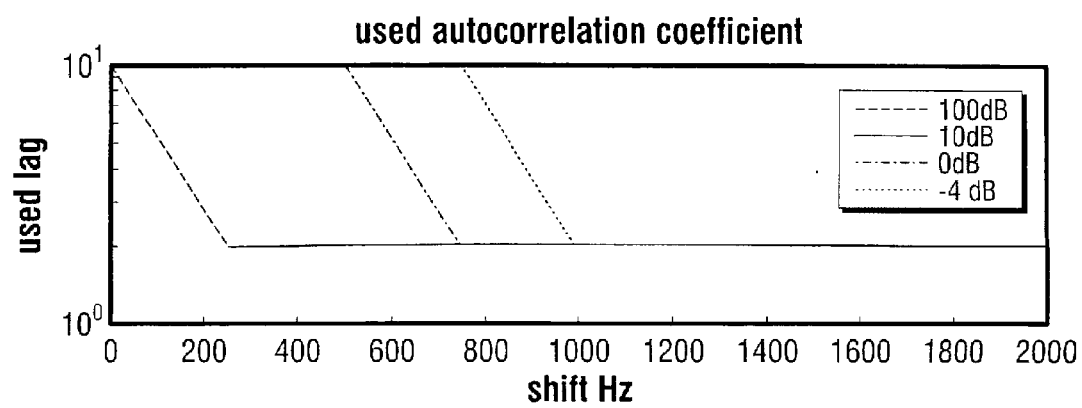
Figure 13A:
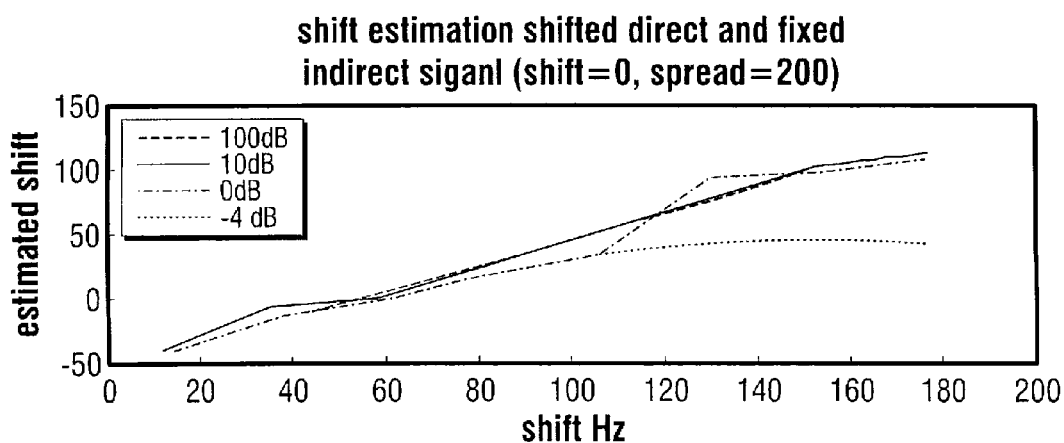
Figure 13B:
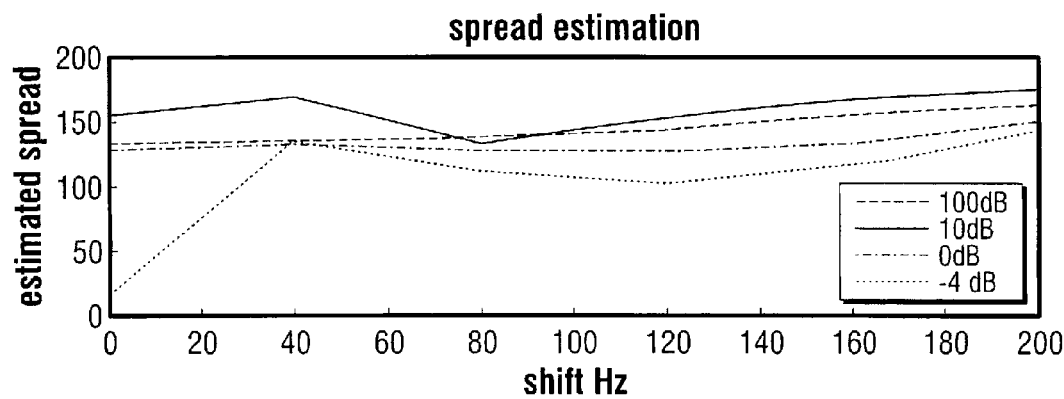
Figure 13C:
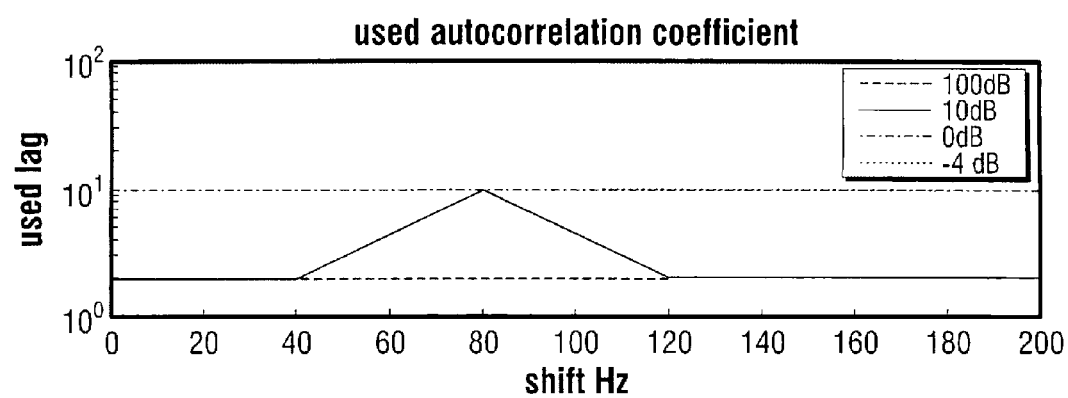

In the following description of the present invention it will be referred to the enclosed figures wherein:

FIG. 1 is a diagram showing a exemplary graph of a Doppler spectrum,

FIG. 2 is a diagram illustrating the relative error of an estimation for a second derivative of an auto correlation function for a Doppler spectrum according to the invention due to additive white noise, FIG. 3 is a diagram illustrating the relative error for a further estimation for a second derivative of an autocorrelation function for a Doppler spectrum according to the present invention due to lower spectral sampling resolution caused by use of larger correlation coefficients, FIG. 4 is a diagram illustrating a sum of relative errors for estimations for a second derivative of an autocorrelation function for a Doppler spectrum according to the present invention due to additive white noise and due to a linear proximation error, FIG. 5 is a schematic illustration of a frame structure for a DPPCH, FIG. 6 is a schematic illustration of a demodulated radio signal, FIG. 7 is a schematic illustration of a calculation of an autocorrelation function for a Doppler spectrum according to the present invention, FIG. 8 is a schematic illustration of a calculation of an autocorrelation coefficient for the demodulated signal illustrated in FIG. 6, FIG. 9 is a schematic illustration of a calculation of a further autocorrelation coefficient for the signal illustrated in FIG. 6, FIG. 10 illustrates a simulation environment for a Doppler spread estimation according to the present invention, FIG. 11 shows diagrams of results obtain from the simulation environment shown in FIG. 10 for an indirect received radio signal, FIG. 12 shows diagrams of results obtained from the simulation environment shown in FIG. 10 for a direct received radio signal, and FIG. 13 shows diagrams of results obtained from the simulation environment shown in FIG. 10 for received superposed direct and indirect signals.

DESCRIPTION OF A PREFERRED EMBODIMENT

The following description presents a time domain based algorithm for an estimation of a frequency offset and a Doppler spread for a radio signal of a mobile communications environment. The estimation will be based on the measurement of an autocorrelation function of channel coefficients. The method presented here is designed to be independent from the actual shape of a power spectrum density of a radio signal channel.

In the description, the following symbol definitions will be employed:

$f_{max}$ highest frequency appearing in a non shifted Doppler spectrum
$\underline{c}(k)$ complex coefficient of a time variant channel pulse response
$r_{cc}(n)$ time discrete autocorrelation sequence of a signal c
$\phi_{cc}(f)$ power density spectrum of a signal c
T sampling period
$\delta(f)$ dirac pulse in frequency domain
$f_0$ frequency offset
$\sigma_0$ variance
$B^{(1)}$ Doppler shift
$B^{(2)}$ Doppler spread
$\phi_{cc}(t)$ time continuous autocorrelation function of a signal c
$\dot{\phi}_{cc}(t)$ first derivative in respect of time of time continuous autocorrelation function of a signal c
$\ddot{\phi}_{cc}(t)$ second derivative in respect of time of a time continuous autocorrelation function of a signal c
L correlation influence length
$\tilde{\dot{\phi}}_{cc}(t)$ estimation for $\dot{\phi}_{cc}(0)$
$\tilde{\phi}_{cc}(t)$ estimation for $\phi_{cc}(0)$
$\tilde{B}^{(1)}$ estimation for Doppler shift $B^{(1)}$
$\tilde{B}^{(2)}$ estimation for Doppler spread $B^{(2)}$
b(f,t) spectral signal component of a received signal
$\underline{n}(k)$ complex additive white noise
N signal power of additive white noise $\underline{n}(\kappa)$
$\kappa$ index for autocorrelation coefficient (lag)
$\phi_{cc}^{(\kappa)}(0)$ estimation for $\phi_{cc}(0)$ based on autocorrelation coefficient $\kappa$
$\dot{\phi}_{cc}^{(\kappa)}(0)$ estimation for $\dot{\phi}_{cc}(0)$ based on autocorrelation coefficient $\kappa$
$\ddot{\phi}_{cc}^{(\kappa)}(0)$ estimation for $\ddot{\phi}_{cc}(0)$ based on autocorrelation coefficient $\kappa$
$\tilde{B}_{\kappa}^{(1)}$ estimation for $B^{(1)}$ based on autocorrelation coefficient $\kappa$
$\tilde{B}_{\kappa}^{(2)}$ estimation for $B^{(2)}$ based on autocorrelation coefficient $\kappa$
$\tilde{\ddot{\phi}}_{cc}(0)$ estimation for $\ddot{\phi}_{cc}(0)$ based on autocorrelation coefficient $\kappa$ and disturbed by additive white noise $\underline{n}(\kappa)$
$\epsilon_{noise}$ relative error of the estimation for $\ddot{\phi}_{cc}(0)$ due to additive white noise $\underline{n}(\kappa)$
$\epsilon_{approx}$ relative error of the estimation for $\ddot{\phi}_{cc}(0)$
$n_p$ number of pilot symbols per slot in the DPCCH channel
$n_s$ total number of symbols per slot in the DPCCH channel
y(n) received signal with influence of slot format
r $B^{(2)}/f_{max}$
v velocity of a mobile entity
$SNR_{lag}$ signal to noise ratio for the estimation of $\ddot{\phi}_{cc}(0)$ using a particular autocorrelation coefficient
$SNR_{thr}$ threshold value for $SNR_{lag}$ to decide usage of a particular autocorrelation coefficient
$c_0$ speed of light $$(3 \cdot 10^8 \, \frac{m}{s})$$

$f_c$ carrier frequency (e.g. $2 \cdot 10^9$ Hz)
$c_d(k)$ direct signal component of an undisturbed received signal
$a_d$ amplitude of a direct signal component of an undisturbed received signal
$P_d$ power of a direct signal component of an undisturbed received signal
$c_i(k)$ indirect-signal component of an undisturbed received signal
$P_i$ power of an indirect signal component of an undisturbed received signal
$\mu_1(k)$ real part of $c_i(k)$
$\mu_2(k)$ imaginary part of $c_i(k)$
$N_i$ number of sine signals to generate $\mu_i(k)$
$v_{i,n}$ amplitude of spectral component of $\mu_i(k)$
$f_{i,n}$ frequency of spectral component of $\mu_i(k)$ Definition of Doppler Shift and Spread A transmission channel for a mobile communications environment can be described by a sequence $\underline{c}(k)$ of complex time variant channel coefficience:

$$\underline{c}(k) = Re\{\underline{c}(k)\} + jIm\{\underline{c}(k)\} \quad (7)$$

The channel coefficience sequence can be modeled as a time discrete stationary random process wherein an autocorrelation sequence $r_{cc}(n)$ can be defined as $$r_{cc}(n) = \lim_{K \to \infty} \frac{1}{2K+1} \sum_{k=-K}^{K} \underline{c}^*(k) \underline{c}(k+n) \quad (8)$$

Transformed into the frequency domain, the resulting power density spectrum $\phi_{cc}(f)$ is given by $$\phi_{cc}(f) = \sum_{n=-\infty}^{\infty} \varphi_{cc}(n) e^{-2\pi j f T n} \quad (9)$$

The power density function which is also called Doppler power density spectrum describes the spectral distribution of an unmodulated radio signal transmitted over a channel c. On the basis of the Doppler spectrum, two expressions characterizing the Doppler spectrum can be defined, namely the Doppler shift $B^{(1)}$ and the Doppler spread $B^{(2)}$:

$$B^{(1)} = \frac{\int_{-\infty}^{\infty} f \phi_{cc}(f) df}{\int_{-\infty}^{\infty} \phi_{cc}(f) df} \quad (10)$$

and $$B^{(2)} = \sqrt{\frac{\int_{-\infty}^{\infty} (f - B^{(1)})^2 \phi_{cc}(f) df}{\int_{-\infty}^{\infty} \phi_{cc}(f) df}} \quad (11)$$

The Doppler shift $B^{(1)}$ can be interpreted as a center of gravity of the Doppler spectrum $\phi_{cc}(f)$. Since equations (10) and (11) are based on the Doppler spectrum $\phi_{cc}(f)$ and require integration's in the frequency domain, these equations are difficult to compute. This problem can be solved by computing the Doppler shift $B^{(1)}$ and the Doppler spread $B^{(2)}$ in the time domain. For that purpose the time continuous autocorrelation function $\phi_{cc}(t)$ is calculated as an inverse Fourier transformation of $\phi_{cc}(f)$:

$$\varphi_{cc}(t) = \int_{-\infty}^{\infty} \phi_{cc}(f) \cdot e^{j2\pi ft} df \qquad (12)$$

Further, the first and second derivatives of the autocorrelation function $\phi_{cc}(t)$ with respect of t are calculated by:

$$\dot{\varphi}_{cc}(t) = \int_{-\infty}^{\infty} j2\pi f \phi_{cc}(f) e^{j2\pi ft} df \qquad (13)$$

and $$\ddot{\varphi}_{cc}(t) = -\int_{-\infty}^{\infty} 4\pi^2 f^2 \phi_{cc}(f) e^{j2\pi ft} df. \qquad (13)$$

For an elimination of the integration terms in equations (10) and (11), t is set to 0 in equations (12), (13) and (14). As a result, the Doppler shift $B^{(1)}$ and the Doppler spread $B^{(2)}$ are given by:

$$B^{(1)} = \frac{1}{2\pi j} \frac{\dot{\varphi}_{cc}(0)}{\varphi_{cc}(0)} \qquad (15)$$

and $$B^{(2)} = \frac{1}{2\pi} \sqrt{\left(\frac{\dot{\varphi}_{cc}(0)}{\varphi_{cc}(0)}\right)^2 - \frac{\ddot{\varphi}_{cc}(0)}{\varphi_{cc}(0)}} \qquad (16)$$

Thus, the Doppler spread $B^{(1)}$ and the Doppler shift $B^{(2)}$ can be easily computed in case the autocorrelation function of the respective channel coefficient sequence is known, derived twice and evaluated for t=0. It has to be noted that equations (15) and (16) are equivalent to equations (10) and (11) since no type of Doppler spectrum has been assumed.

Recursive Calculation of the Autocorrelation Sequence

On the basis of equation (7) defining the autocorrelation sequence for a time discrete signal, the $n^{th}$ coefficient for a complex signal s at a time m can be estimated using the following recursive expression:

$$r_{SS}(n, m) = \lim_{K \to \infty} \frac{1}{2K+1} \sum_{k=-K}^{K} \underline{s}*(k+m)\underline{s}(k+n+m) \qquad (17)$$

Assuming the signal s is a causal signal s(t) with s(t)=0 for t>m at a given time m and further assuming a correlation influence length for the correlation to be calculated is given by L, an average value of the product $\underline{s}^*(k)\underline{s}(k+n)$ can be calculated for a period L. Thus, the following equation is obtained:

$$r_{SS}(n, m) = \frac{1}{L-n} \sum_{k=1-L}^{-n} \underline{s}*(k+m)\underline{s}(k+n+m) \qquad (18)$$

For a time m+1, the $n^{th}$ coefficient $r_{ss}$ is given by:

$$r_{SS}(n, m+1) = \frac{1}{L-n} \sum_{k=1-NL}^{-n} \underline{s}*(k+m+1)\underline{s}(k+n+m+1) \qquad (19)$$

-continued $$= \frac{1}{L-n} \sum_{k=2-L}^{-n+1} \underline{s}*(k+m)\underline{s}(k+n+m)$$

Using equation (18) equation (19) can be expressed as:

$$r_{SS}(n, m+1) = r_{SS}(n, m) + \frac{\underline{s}*(m-n+1)\underline{s}(m+1) - \underline{s}*(m+1-L)\underline{s}(1-L+m+n)}{L-n}. \qquad (20)$$

The computational effort for calculating such coefficients of the autocorrelation sequence is low and independent from the correlation influence length.

Exponential Smoothing of the Autocorrelation Coefficients

The above given expression for coefficients of the autocorrelation sequence requires a memory capable of holding a number of L complex samples of the signal s. In order to reduce the memory required for computing equation (20), an exponential averaging is employed resulting in the following expression:

$$r_{ss}(n, m+1) = \alpha \cdot \underline{s}*(m-n+1)\underline{s}(m+1) + (\alpha-1) \cdot r_{ss}(n,m) \qquad (21)$$

The parameter a is chosen to be 1/L whereby the influence of the "newest" or "latest" product $\underline{s}*(m-n+1)\underline{s}(m+1)$ on the result obtained from equation (21) will be the same as for equation (20).

As a result, the memory required for a signal length is given by $n_{max}$ which is the largest coefficient of the autocorrelation function to be evaluated, which is, in general, much smaller than the correlation influence length.

Calculation of Discrete Values of the Correlation Function's Derivatives

The autocorrelation sequence $r_{ss}(n)$ is a time discrete representation of the autocorrelation function $\phi_{cc}(t)$:

$$r_{cc}(n) = \phi_{cc} nT \qquad (22)$$

wherein T denotes a sampling period. This relation can be employed to calculate the values of the first and second derivatives of the autocorrelation function. Since the autocorrelation function's first derivative $\dot{\phi}_{cc}(0)$ is the slope of the autocorrelation function $\phi_{cc}(t)$ at a time t=0 and the autocorrelation function's second derivative $\ddot{\phi}_{cc}(0)$ is the slope of the autocorrelation function's first derivative $\dot{\phi}_{cc}(t)$ for a time t=0, the autocorrelation function's first derivative $\dot{\phi}_{cc}(0)$ can be estimated to be:

$$\dot{\varphi}_{cc}(0) \approx \tilde{\dot{\phi}}_{cc}(0) = \frac{\varphi_{cc}(T) - \varphi_{cc}(-T)}{2T} = \frac{r_{cc}(1) - r_{cc}(-1)}{2T}. \qquad (23)$$

Further, some characteristics of the autocorrelation sequence $r_{cc}(n)$ are exploited:

The autocorrelation sequence $r_{cc}(n)$ is a complex expression, wherein the real part thereof is even such that the following expression is valid:

$$Re\{r_{cc}(k)\} = Re\{r_{cc}(-k)\} \qquad (24)$$

Moreover, the imaginary part of the autocorrelation sequence $r_{cc}(n)$ is odd and can be defined by:

$$Im\{r_{cc}(k)\} = -Im\{r_{cc}(-k)\} \qquad (25)$$

In addition, the autocorrelation sequence $r_{cc}(n)$ for $n=0$ represents the average power of the channel coefficient sequence $c(k)$ (see equation (7)) and is real.

As a result, equation (23) can be written as:

$$\tilde{\dot{\varphi}}_{cc}(0) = \frac{j\mathrm{Im}\{r_{cc}(1)\}}{T} \qquad (26)$$

In order to calculate $\ddot{\varphi}_{cc}(0)$, $\dot{\varphi}_{cc}(T/2)$ and $\dot{\varphi}_{cc}(-T/2)$ are calculated:

$$\dot{\varphi}_{cc}\left(-\frac{T}{2}\right) \approx \tilde{\dot{\varphi}}\left(-\frac{T}{2}\right) = \frac{r_{cc}(0) - r_{cc}(-1)}{T} \qquad (27a)$$

and $$\dot{\varphi}_{cc}\left(\frac{T}{2}\right) \approx \tilde{\dot{\varphi}}_{cc}\left(\frac{T}{2}\right) = \frac{r_{cc}(1) - r_{cc}(0)}{T} \qquad (27b)$$

This leads to the following expression for $\ddot{\varphi}_{cc}(0)$:

$$\ddot{\varphi}_{cc}(0) \approx \tilde{\ddot{\varphi}}_{cc}(0) = \frac{\tilde{\dot{\varphi}}_{cc}\left(\frac{T}{2}\right) - \tilde{\dot{\varphi}}_{cc}\left(-\frac{T}{2}\right)}{T} = \frac{\varphi_{cc}(T) - 2\varphi_{cc}(0) + \varphi_{cc}(-T)}{T^2} = 2\frac{\mathrm{Re}\{r_{cc}(1)\} - r_{cc}(0)}{T^2} \qquad (28)$$

As a result, the Doppler characteristics of the radio signal transmission channel are obtained on the basis of only two complex values of the autocorrelation sequence namely, $r_{cc}(0)$ and $r_{cc}(1)$. This leads to the following estimations for the Doppler shift $B^{(1)}$ and the Doppler spread $B^{(2)}$:

$$B^{(1)} \approx \tilde{B}^{(1)} = \frac{1}{2\pi T} \frac{\mathrm{Im}\{r_{cc}(1)\}}{r_{cc}(0)} \qquad (29)$$

and $$B^{(2)} \approx \tilde{B}^{(2)} = \frac{1}{2\pi T} \sqrt{2 - \left(\frac{\mathrm{Im}\{r_{cc}(1)\}}{r_{cc}(0)}\right)^2 - \frac{2\mathrm{Re}\{r_{cc}(1)\}}{r_{cc}(0)}} \qquad (30)$$

Error Estimating of the Derivatives of the Autocorrelation Function

In order to estimate the accuracy of the estimations for the first and second derivatives for the autocorrelation function, it is assumed that the sequence of channel coefficients can be modelled as discrete samples of a sum of an infinite number of sine signals with random phases and given amplitudes:

$$\underline{c}(t) = \int_{-\infty}^{\infty} a(f)e^{j(2\pi ft + \varphi(f))}df = \int_{-\infty}^{\infty} b(f,t)df \qquad (31)$$

Since the products of Fourier transformations of the functions $b(f_1,t)$ and $b(f_2,t)$ are zero, these functions are uncorrelated:

$$\phi_{b_1 b_2} = F\{\phi_{b_1 b_2}\} \qquad (32)$$

wherein $$\phi_{b_1 b_1} = b_1(f) * b_2(-f)$$

resulting in $$\phi_{b_1 b_2} = F\{b_1(t)\} \cdot F\{b_2(-t)\} \equiv 0 \quad \vee \quad b_1(t) = b(f_1, t) \qquad (33)$$
$$b_2(t) = b(f_2, t)$$
$$f_1 \neq f_2$$

Thus, the cross power spectrum density is equal to zero and, as a result, the cross-correlation function is also zero.

Therefore, the autocorrelation function of $\underline{c}(t)$ can be written as an infinite sum of the autocorrelation functions of $b(f,t)$:

$$\varphi_{cc}(\tau) = \int_{-\infty}^{\infty} \varphi_{bb}(\tau, f)df \qquad (34)$$

resulting in $$\varphi_{bb}(\tau, f) = \lim_{T \to \infty} \frac{1}{2T} \int_{-T}^{T} a(f)e^{-j(2\pi ft + \varphi(f))} a(f)e^{j(2\pi f(t+\tau) + \varphi(f))} dt \qquad (35)$$
$$= a^2(f)(\cos 2\pi f\tau + j\sin 2\pi f\tau)$$

The real part of the autocorrelation function $\phi_{cc}(\tau)$ comprises an infinite sum of cosine functions, while the imaginary part thereof comprises an infinite sum of sine functions. In view of the derivation rules for sine and cosine functions, the autocorrelation function of $b(f,t)$ and its first and second derivatives evaluated for $\tau=0$ can be written as:

$$\phi_{bb}(0,f) = a^2(f)$$
$$\dot{\phi}_{bb}(0,f) = j2fa^2(f)$$
$$\ddot{\phi}_{bb}(0,f) = -4\pi^2 f^2 a^2(f) \qquad (36)$$

On the basis of the estimation defined in equation (23) for an estimation of the slope of $\phi_{cc}(\tau)$ for $\tau=0$ by a linear interpolation between $\phi_{cc}(T)$ and $\phi_{cc}(-T)$, the autocorrelation function for a spectral element $b(f,t)$ can be described by:

$$\dot{\phi}_{bb}(0, f) = j2\pi fa^2(f) \approx \frac{j\mathrm{Im}\{\varphi_{bb}(T, f)\}}{T} = j \cdot a^2(f) \frac{\sin(2\pi fT)}{T} \qquad (37)$$

Thus, the term $2\pi fT$ is estimated to represent $\sin(2\pi fT)$ for which it is required that the sampling period T is larger than the inverse of the frequency f. The same applies for an estimation of $\ddot{\phi}_{bb}(0,f)$. The largest error for a spectral element $b(f,t)$ is obtained for a highest frequency $f=f_{max}$.

Estimation Error Due to Additive White Noise

In the case the received radio signal $\underline{c}(k)$ is disturbed by additive white noise $\underline{n}(k)$, the resulting received signal or input signal $\underline{x}(k)$ is given by:

$$\underline{x}(k) = \underline{c}(k) + \underline{n}(k). \qquad (38)$$

Since the additive white noise $\underline{n}(k)$ is independent from the radio signal $\underline{c}(k)$, the autocorrelation sequence $r_{xx}(k)$ of the input signal $\underline{x}(k)$ is given by:

$$r_{xx}(k) = r_{cc}(k) + r_{nn}(k) \qquad (39)$$

and the power density spectrum $\Phi_{xx}(f)$ is given by:

$$\Phi_{xx}(f)=\Phi_{cc}(f)+\Phi_{nn}(f) \quad (40)$$

In the case the additive noise is additive white noise and the noise power is N, the autocorrelation function $r_{nn}(k)$ of the additive white noise can be expressed as:

$$r_{nn}(k)=N\delta(k). \quad (41)$$

As a result, the input signal $x(k)$ and its autocorrelation function $\phi_{xx}(f)$ can be written as:

$$r_{xx}(k)=r_{cc}(k)+N\delta(k) \quad (42)$$

and $$\Phi_{xx}(f)=\Phi_{cc}(f)+N \quad (43)$$

Referring to equations (29) and (30), for a radio signal disturbed by additive white noise, $r_{cc}(0)$ has to be replaced by $r_{xx}(0)$ resulting in the following definitions for estimations of the Doppler shift $\tilde{B}^{(1)}$ and the Doppler spread $\tilde{B}^{(2)}$:

$$\tilde{B}^{(1)} = \frac{1}{2\pi T}\frac{\text{Im}\{r_{xx}(1)\}}{r_{xx}(0)} = \frac{1}{2\pi T}\frac{\text{Im}\{r_{cc}(1)\}}{r_{cc}(0)+N} \quad (44)$$

and $$\tilde{B}^{(2)} = \frac{1}{2\pi T}\sqrt{2-\left(\frac{\text{Im}\{r_{xx}(1)\}}{r_{xx}(0)}\right)^2 - \frac{2\text{Re}\{r_{xx}(1)\}}{r_{xx}(0)}} \quad (45)$$

$$= \frac{1}{2\pi T}\sqrt{2-\left(\frac{\text{Im}\{r_{cc}(1)\}}{r_{cc}(0)+N}\right)^2 - \frac{2\text{Re}\{r_{cc}(1)\}}{r_{cc}(0)+N}}$$

$$= \frac{1}{2\pi T}\sqrt{2-\frac{\text{Im}^2\{r_{cc}(1)\} - 2\text{Re}\{r_{cc}(1)\}(r_{cc}(0)+N)}{(r_{cc}(0)+N)^2}}$$

As can be derived from equations (44) and (45), it will be appreciated that additional white noise has a significant effect on the estimation results, in particular for the Doppler spread $\tilde{B}^{(2)}$.

One approach is based on the assumption that a good estimation is given for the noise power N for example provided by a signal processing unit. Then, it is possible to simply deduct the noise power N from $r_{xx}(0)$ to compensate the influence of additive white noise. Nevertheless, this approach does not take into account the high noise sensitivity of an estimation for the autocorrelation function's second derivative $\ddot{\phi}_{xx}(0)$ as will be discussed below.

Another approach which is based on estimations without using $r_{xx}(0)$ will be detailed in the following section.

Modifications for Decreasing Noise Sensitivity

As can be derived from equations (41) and (42), additional white noise only changes one single value in the autocorrelation sequence $\phi_{cc}$ of the received-signal c. In particular, the value influenced by additional white noise is the value $r_{xx}(0)$. For further values of the input signal's autocorrelation function $r_{xx}(k)$ with $k \neq 0$ the autocorrelation sequence remains unchanged and is thus independent from additional white noise.

Further, it has to be considered that the above relation can be considered valid for an infinite correlation influence length L of the autocorrelation function. Here, the autocorrelation function $r_{nn}(k)$ of the additive white noise can be estimated by:

$$r_{nn}(k) = \begin{cases} N, & k = 0 \\ \dfrac{N}{\sqrt{L}}, & k \neq 0 \end{cases} \quad (46)$$

For calculating the Doppler parameters without using $r_{xx}(0)$, it is referred to equations (44) and (45) wherein $r_{xx}(0)$ appears in the denominator. On the basis of the above results (in particular see section "error in estimating the derivatives") the autocorrelation function $\phi_{cc}(0)$ for a received radio signal can be estimated by:

$$\phi_{cc}(0) = \tilde{\phi}_{cc}^{(1)}(0) = \text{Re}\{r_{xx}(1)\} \quad (47)$$

For an estimation of the first derivative of the autocorrelation function $\dot{\phi}_{cc}(0)$ (see equation (26)), $\phi_{cc}(0)$ is not employed which results in:

$$\tilde{\dot{\phi}}_{cc}(0) \approx \tilde{\dot{\phi}}_{cc}^{(1)}(0) = \frac{j\,\text{Im}\{r_{xx}(1)\}}{T} \quad (48)$$

In equation (26), the second derivative of the autocorrelation function $\ddot{\phi}_{cc}(0)$ was estimated on the basis of the difference between $\dot{\phi}_{cc}(-T/2)$ and $\dot{\phi}_{cc}(T/2)$. Here, this estimation is based on the difference between $\dot{\phi}_{cc}(1, 5T)$ and $\dot{\phi}_{cc}(-1, 5T)$ leading to:

$$\tilde{\ddot{\phi}}_{cc}(0) \approx \frac{\tilde{\dot{\phi}}_{cc}(1.5T) - V\tilde{\dot{\phi}}_{cc}(-1.5T)}{3T} \quad (49)$$

$$= \frac{r_{cc}(2) - r_{cc}(1) - (r_{cc}(-1) - r_{cc}(-2))}{3T^2}$$

$$= 2\frac{\text{Re}\{r_{cc}(2) - r_{cc}(1)\}}{3T^2}$$

From equation (49), an estimation for the disturbed input signal x can be defined as:

$$\tilde{\ddot{\phi}}_{cc}^{(1)}(0) = 2\frac{\text{Re}\{r_{xx}(2) - r_{xx}(1)\}}{3T^2}. \quad (50)$$

The estimation of the slope of the first derivative of the autocorrelation function $\phi_{cc}$ at time 0 is based on linear approximation between two points being separated by a duration of 3T. Therefore, it has to be considered that this approximation will provide better results the more the condition $3Tf \ll 1$ is fulfilled (see section "error in estimating the derivatives").

On the basis of the above observations, estimations for the Doppler shift $\tilde{B}^{(1)}$ and the Doppler spread $\tilde{B}^{(2)}$ are given by:

$$\tilde{B}_2^{(1)} = \frac{1}{2\pi T}\frac{\text{Im}\{r_{xx}(1)\}}{\text{Re}\{r_{xx}(1)\}} \text{ and} \quad (51)$$

$$\tilde{B}_2^{(2)} = \frac{1}{2\pi T}\sqrt{\frac{2}{3}-\left(\frac{\text{Im}\{r_{xx}(1)\}}{\text{Re}\{r_{xx}(1)\}}\right)^2 - \frac{2\text{Re}\{r_{xx}(2)\}}{3\text{Re}\{r_{xx}(1)\}}} \quad (52)$$

Calculating this more general expressions based on $r_{xx}(1)$ and $r_{xx}(k)$ for $k \geq 2$ leads to:

$$\tilde{\varphi}_{cc}^{(\kappa)}(0) = \text{Re}\{r_{xx}(1)\} \tag{53}$$

$$\dot{\tilde{\varphi}}_{cc}^{(\kappa)}(0) = \frac{j\text{Im}\{r_{xx}(1)\}}{T} \tag{54}$$

$$\tilde{\varphi}_{cc}^{(\kappa)}\left(\frac{\kappa+1}{2}\right) = \frac{r_{xx}(\kappa) - r_{xx}(1)}{(\kappa - 1)T} \tag{55}$$

$$\ddot{\tilde{\varphi}}_{cc}^{(\kappa)}(0) = \frac{\tilde{\varphi}_{cc}^{\kappa}\left(\frac{\kappa+1}{2}\right) - \tilde{\varphi}_{cc}^{\kappa}\left(-\frac{\kappa+1}{2}\right)}{(\kappa+1)T} = 2\frac{\text{Re}\{r_{xx}(\kappa) - r_{xx}(1)\}}{(\kappa^2 - 1)T^2} \tag{56}$$

As a result, the Doppler shift $B^{(1)}$ and the Doppler spread $B^{(2)}$ can be estimated as follows:

$$\tilde{B}_\kappa^{(1)} = \frac{1}{2\pi T} \frac{\text{Im}\{r_{xx}(1)\}}{\text{Re}\{r_{xx}(1)\}} \text{ and} \tag{57}$$

$$\tilde{B}_\kappa^{(2)} = \frac{1}{2\pi T} \sqrt{\frac{2}{\kappa^2 - 1} - \left(\frac{\text{Im}\{r_{xx}(1)\}}{\text{Re}\{r_{xx}(1)\}}\right)^2 - \frac{2\text{Re}\{r_{xx}(\kappa)\}}{(\kappa^2 - 1)\text{Re}\{r_{xx}(1)\}}} \tag{58}$$

Choosing the Optimal Autocorrelation Coefficient

The results of the preceding sections allow for a further control of control on the noise sensitivity of the estimations for the Doppler parameters.

Under noisy conditions, assuming k<<L, equation (56) results in:

$$\ddot{\tilde{\varphi}}_{cc}^{\kappa}(0) = 2\frac{\text{Re}\{r_{cc}(\kappa) - r_{cc}(1)\} + \frac{N}{\sqrt{L}}}{(\kappa^2 - 1)T^2} \tag{59}$$

The relative error $\epsilon_{noise}$ due to additive white noise can be calculated by:

$$\epsilon_{noise} = \frac{\ddot{\tilde{\varphi}}_{cc}^{\kappa}(0) - \ddot{\tilde{\varphi}}_{cc}^{\kappa}(0)}{\ddot{\tilde{\varphi}}_{cc}^{\kappa}(0)} = \frac{N}{\sqrt{L \cdot \text{Re}\{r_{cc}(\kappa) - r_{cc}(1)\}}} \tag{60}$$

As detailed in section "error in estimating the derivatives", $r_{cc}(k)$ has a cosine like shape for a band limited signal wherein $k \cdot T < 1/(f_{max})$. The absolute value of the denominator will increase for a raising k leading to an increase of the estimation accuracy as illustrated in FIG. 2 calculated for a signal to noise ratio of 1 and L=15.000.

In order to calculate the maximum error due to the linear approximation of $\ddot{\phi}_{cc}(0)$, the worst case power distribution is assumed wherein power is concentrated at $f=f_{max}$. This results in the power density spectrum:

$$\phi_{ss}(f) = \frac{S}{2}(\delta(f + f_{max}) + \delta(f - f_{max})) \tag{61}$$

where S denotes the signal power.

Equation (57) can be transformed to the autocorrelation function $\phi_{xx}(t)$ and the second derivative $\ddot{\phi}_{xx}(t)$ for t=0:

$$\phi_{xx}(t) = S \cdot \cos(2\pi f_{max} t) \tag{62}$$

and $$\ddot{\phi}_{xx}(0) = -4\pi^2 f_{max}^2 S \tag{63}$$

The estimation for $\ddot{\phi}_{xx}(0)$ results to:

$$\ddot{\tilde{\varphi}}_{cc}^{\kappa}(0) = 2\frac{\text{Re}\{\varphi_{cc}(\kappa) - \varphi_{cc}(1)\}}{(\kappa^2 - 1)T^2} \tag{64}$$

$$= 2S\frac{\cos(2\pi f_{max} \kappa T) - \cos(2\pi f_{max} T)}{(\kappa^2 - 1)T^2}$$

This leads to the following definition of an estimated relative error $\epsilon_{approx}$:

$$\epsilon_{approx} = \frac{\ddot{\tilde{\varphi}}_{cc}^{\kappa}(0) - \ddot{\tilde{\varphi}}_{cc}^{\kappa}(0)}{\ddot{\tilde{\varphi}}_{cc}^{\kappa}(0)} \tag{65}$$

$$= \frac{1}{2}\frac{\cos(2\pi f_{max}T) - \cos(2\pi f_{max}\kappa T)}{(\kappa - 1)T^2 \pi^2 f_{max}^2} - 1$$

A graph illustrating the thus obtained estimated relative error $\epsilon_{approx}$ is shown in FIG. 3. Comparing FIGS. 2 and 3, it can be appreciated that a certain κ has to be chosen to keep both the relative error $\epsilon_{noise}$ and the approximated relative error $\epsilon_{approx}$ below a predefined error $\epsilon_{max}$.

A summed error $\epsilon_{sum}$ obtained by an addition of the amount of the maximal relative error $\epsilon_{noise}$ and the amount of the maximal approximated relative error $\epsilon_{approx}$ is illustrated in FIG. 4. From FIG. 4 it can be derived that a specific κ has to be chosen for different Doppler spreads which will be discussed below in greater detail.

Influence of the Slot Format

As explained in the beginning, the approach to estimate the Doppler parameters on the basis of pilot symbols or groups does not result in good estimations for a Doppler spectrum for which high frequencies are expected. In order to provide for a sufficient estimation of Doppler parameters even for high frequency offsets, the solution described herein is employed on symbol level, particularly by using demodulated pilot symbols of a pilot group contained in a slot. As a result, the sampling period T utilized here essentially corresponds to the symbol rate in a slot. For example, in an UMTS system, the symbol rate for an uplink data communication is 15 kHz leading to a sampling period T of $6,6 \cdot 10^{-5}$ seconds. Thus, in an UMTS system frequencies of up to 7.500 Hz can be estimated.

As shown above, a calculation of an autocorrelation function which represents the only calculation on sampling rate T does not require complex computations and further involves computations only of a small number of coefficients.

In the following, the symbol level solution is described with respect to a mobile communications environment according to the standards of GSM or UTMS. Therefore, some issues discussed below will not araise in other communications environments wherein the Doppler shift and Doppler spread estimation presented herein is used and which are not operated according to the GSM or UTMS standard.

As shown in FIG. 5, the so called dedicated physical control channel DPCCH is used to transmit radio frames including a predefined number of slots. Each slot is comprised by a predefined number of pilot bits having a predefined pattern, feedback information (FBI) bits, bits for transmit power control (TPC) commands and optionally bits for a transport format combination indicator (TFCI). The pilot bits or pilot symbols which are used for an estimation of Doppler shift and Doppler spread of subsequent slots do not represent a continuous sequence but are separated by other control bits such as TPC, FBI and FTCI bits.

Thus, each slot includes a number of pilot bits $n_p$ followed by a number of $n_s-n_p$ other control bits resulting in number of $n_s$ bits per slot. To extract a sequence of pilot bits of slots of a common frame a pilot sequence is defined as a sequence of $n_p$ pilot bits for the first slot followed by $n_s-n_p$ zeros followed by a sequence of $n_p$ pilot bits of a second slot followed by $n_s-n_p$ zeros followed by a sequence of $n_p$ pilot bits of a third slot or followed by $n_s-n_p$ zeros, . . . and so forth for all slots of a frame. Assuming a received signal y(n) demodulated with such a pilot sequence, a demodulated signal y(k) shown in FIG. 6 will result.

For illustrating a calculation of the autocorrelation coefficients $r_{yy}(0)$ and $r_{yy}(1)$ it is referred to FIG. 7. This figure shows a calculation of a specific autocorrelation coefficient $r_{xx}(m)$ of the autocorrelation sequence of a time discrete signal x(n) comparable to the so called "Papierstreifenmethode". The first input sequence is conjugated and written in the first line. The input sequence is shifted by m and written in the second line. Then, the values of same columns are multiplied (for example: x*(n)·x(n+m) and each of the results is respectively written in the same column. As indicated by the expression below the thick line in FIG. 7, the resulting products are added and the resulting sum is divided by the number of columns. This results in the $m^{th}$ coefficient of the autocorrelations.

In a comparable manner, FIG. 8 illustrates a calculation of the autocorrelation coefficient $r_{yy}(0)$ of the demodulated signal y(k). It can be seen that for $n_s-n_p$ columns per slot the multiplications of respective values of the first and second lines result in a value of 0 and that $n_p$ columns per slot are left. As a result, the averaging process for the interrupted sequence shown in FIG. 6 is lowered by a factor $n_p/n_s$ compared to the averaging process illustrated in FIG. 7. The autocorrelation coefficient $r_{xx}(0)$ can be written as:

$$r_{xx}(0) = \frac{n_s}{n_p} r_{yy}(0) \quad (66)$$

This is due to the fact that the coefficient "0" of an autocorrelation function characterizes the respective signal power, wherein the power of the demodulated signal y(k) is reduced by the factor $n_p/n_s$.

For a calculation of coefficient $r_{yy}(1)$, as illustrated in FIG. 9, a number of $n_s-n_p+1$ columns having a value of zero is obtained per slot. Thus, the averaging process results in a reduction by a factor $$\frac{n_s}{n_p - 1}:$$

$$r_{xx}(1) = \frac{n_s}{n_p - 1} r_{yy}(1) \quad (67)$$

Performing a comparable calculation for the autocorrelation coefficient $r_{cc}(2)$, the following expression can be obtained:

$$r_{xx}(2) = \frac{n_s}{n_p - 2} r_{yy}(2) \quad (68)$$

Here, the reducing factor is $$\frac{n_s}{n_p - 2}.$$

This leads to a re-construction of the autocorrelation sequence $r_{xx}(n)$ of the non-interrupted signal x(k) whereby the method described therein can be based on calculations on symbol or bit level. In general, the autocorrelation sequence $r_{xx}$ can be defined by $$r_{xx}(k \cdot n_s + m) = \frac{n_s}{n_s - m} r_{yy}(k \cdot n_s + m) \quad (69)$$

$$\begin{cases} \kappa \text{ an integer} \\ 0 \le m < n_p, m \le n_s - n_p \end{cases}$$

Doppler Spread and Speed of a Mobile Entity

In order to modify the adaptation speed of transmission and/or receiving means (hardware and software) of a moving mobile entity it can be required to determine the speed of motion for the mobile entity. In a communications environment wherein radio signals are only transmitted via single line of sight channels, the Doppler shift or Doppler frequency $f_d$ resulting from a moving entity allows for a calculation of the speed of the entity according to equation of (1). In contrast thereto, as can be derived from the definition of the Doppler spread in equation (11) this is, in general, not possible for a multipath propagation environment. In particular, the Doppler spread as defined in equation (11) does not exhibit a maximum spread frequency $f_{max}$.

Rather, a definition of a maximum spread frequency $f_{max}$ requires a certain shape of a Doppler power density spectrum:

Assuming a Jake's spectrum, as set forth above, solving equation (11) using equation (6) results in :

$$B_f^{(2)} = \frac{f_{max.}}{\sqrt{2}} \quad (70)$$

For a uniform power distribution between two frequencies $-f_{max}<f<f_{max}$ expressed as $$\phi(f) = \frac{1}{2f_{max}} \cdot rect\left(\frac{f}{f_{max}}\right) \quad (72a)$$

the Doppler spread $B^{(2)}$ is given by:

$$B_U^{(2)} = \frac{f_{max}}{\sqrt{3}} \qquad (72b)$$

In the case of a spectrum only exhibiting components at $f_{max}$ and $-f_{max}$, as described by equation (61), the result is:

$$B^{(2)} = f_{max} \qquad (72)$$

As can be derived from the above examples, the more power is concentrated at edges of the power spectrum the more the factor r given by $$r = \frac{B^{(2)}}{f_{max}} \qquad (73)$$

tends to be 1.

Further, if all power is concentrated in the center of the power spectrum, the Doppler spread will become 0. This applies also for a superposition of a Doppler power density resulting from radio signal transmitted via direct and indirect paths. For an estimation of the maximum frequency $f_{max}$, a factor r has to be chosen in the range of 0<r<1. Choosing the factor r to be $1/\sqrt{2}$, the speed of a mobile entity can be expressed as:

$$v = \frac{f_{max} c_0}{f_c} \approx \frac{B^{(2)}}{r} \frac{c_0}{f_c} \qquad (74)$$

wherein $c_0$ denotes the speed of light and $f_c$ denotes the carrier frequency.

Estimation of the Doppler Parameters

On the basis of the result described above, it is possible to define an algorithm for estimations of Doppler parameters. For a calculation of autocorrelation coefficients, at least three different lags κ are required to keep an estimation error for the second derivative of the autocorrelation function below 10%, as illustrated in FIG. 4. Further referring to FIG. 4, three lags κ are chosen to be 2, 10 and 100. In addition, the lags 0 and 1 are employed resulting in a calculation of five coefficients of the autocorrelation sequence.

A calculation of autocorrelation coefficients can be based on equation (20) or, to be more efficient, on equation (21). Referring to the respective part of the description, the choice of a correlation influence length L depends on the worst signal to noise ratio which is expected to occur or which shall be considered. Assuming a signal to noise ratio of 0 dB, the influence length L of 15.000 is chosen whereby a duration of 1 second is averaged. This has to be performed with the symbol or bit rate which is 15 kHz in case of an UMTS system.

A compensation of the slot format will be performed for the calculated five autocorrelation coefficients according to equation (69).

The compensation for the slot format and all further calculations have to be performed as often an update of the Doppler parameters is required.

For a calculation of the Doppler parameters, a suitable lag κ has to be found in order to keep the estimation errors low or under a predefined threshold. One solution is to search for a lag κ for which the estimated signal to noise ratio $SNR_{lag}$ is above a predefined threshold signal to noise ratio $SNR_{thr}$. The smallest lag κ will result in the worst signal to noise ratio for signals with a small Doppler spread while the best estimation error is obtained for signal having higher Doppler spreads. Therefore, the definition for a suitable lag κ can be started with the smallest lag κ.

On the basis of equation (42), the noise power N is calculated:

$$N = Re\{\phi_{xx}(0)\} - Re\{\phi_{xx}(1)\} \qquad (75)$$

The estimation of a noise influence in a specific lag κ is given by:

$$N_{lag} = \frac{N}{\sqrt{L}} \qquad (76)$$

which is the same for all lags κ.

According to equation (61) the estimation of the second derivative of the autocorrelation function is based on the undisturbed signal. Comparing equation (61) and (59) results in:

$$Re\{r_{xx}(\kappa) - r_{xx}(1)\} \approx Re\{r_{cc}(\kappa) - r_{cc}(1)\} + \frac{N}{\sqrt{L}} \qquad (77)$$

Then, the estimated signal to noise ratio $SNR_{lag}$ can be calculated on the basis of the following expression:

$$SNR_{lag} = \frac{Re\{r_{cc}(\kappa) - r_{cc}(1)\}}{N_{lag}} \approx \frac{Re\{r_{xx}(\kappa) - r_{xx}(1)\}}{N_{lag}} - 1 \qquad (78)$$

This leads to the following algorithm.

κ=2
threshold=$(SNR_{min}+1) \cdot N/\sqrt{L}$
while $(\phi_{xx}(1) - \phi_{xx}(\kappa)) <$ threshold && κ!=not found)
κ=next κ

The above algorithm iterates through the lags κ in ascending order assuming that the signal to noise ratio increases with an increasing lag. In the case no lag is found either the noise is too high to estimate a Doppler spread or the Doppler spread is too small. Then it is possible to set the Doppler spread to zero or to calculate a Doppler spread on the basis of equation (58).

Then, the speed of a moving entity is estimated by multiplying the Doppler spread with a factor that depends on the geometry. As an example, the factor is set to $\sqrt{2}$ as described in section "Doppler spread and speed of a mobile entity". The resulting maximum spread frequency $f_{max}$ is multiplied with $c_0/f_0$.

For a calculation of the Doppler shift equation (26) can be used.

Simulation Environment

The algorithm performance was investigated by simulations. The above algorithms and the required signal sources have been implemented in computer program and a structure shown in FIG. 10 was used. As input signal for the algorithms, a combined signal consisting of
  a direct signal,
  an indirect signal, and
  a noise signal was used. The direct signal was implemented as a complex sine signal:

$$c_d(k) = a_d e^{j2\pi f_d kT} = a_d \cos(2\pi f_d kT) + j \cdot a_d \sin(2\pi f_d kT) \quad (79)$$

wherein $a_d$ denotes the amplitude of the direct signal and $f_d$ the frequency offset of the direct path. $a_d$ was expressed as the root of the direct signal's power $P_d$:

$$a_d = \sqrt{P_d} \quad (80)$$

The indirect signal was modelled to have a power density spectrum according to equation (6), a Jake's spectrum. The indirect signal was modeled as sum of two independent noise processes $\mu_1$ and $\mu_2$:

$$C_i(k) = \mu_1(k) + j\mu_2(k) \quad (81)$$

A noise process can be modeled as sums of sine functions of different frequencies and uniformly distributed random phases $\phi_{i,n}$:

$$\mu_i(k) = \sum_{n=1}^{N_i} V_{i,n} \sin(2\pi f_{i,n} kT + \varphi_{i,n}) \quad (82)$$

Parameters in equation (82) are calculated as:

$$v_{i,n} = \sigma_i \sqrt{\frac{2}{N_i}} \quad (83)$$

and $$f_{i,n} = f_{\max} \sin\left(\frac{\pi}{2N_i}\left(n - \frac{1}{2}\right)\right) \quad (84)$$

wherein $\sigma_i$ denotes the variance of the noise process $\mu_i$. The power $P_i$ of the indirect signal can be expressed by $P_i = \sigma_1^2 + \sigma_2^2$. Choosing $\sigma_2 = \sigma_1$ results in:

$$\sigma_i = \sqrt{\frac{P_i}{2}} \quad (85)$$

Achieving independent processes $\mu_1$ and $\mu_2$ can be accomplished by setting $N_2 = N_1 + 1$. The model results in a good approximation of the autocorrelation function of the process up to the $N_1^{th}$ zero crossing of the autocorrelation function. To improve the simulation speed, the required sine signals were generated as set forth below.

Since the simulations require the calculation of many different sine signals, these signals are not generated using the generic "sin" function. Instead-recursive calculations have been performed using a shift register.

For a z-transformation, the following definitions have been used:

$$\sin(2\pi fkT) \rightarrow \frac{z\sin(2\pi fT)}{z^2 - 2z\cos(2\pi fT) + 1} \quad (86)$$

and

-continued $$\cos(2\pi fkT) \rightarrow \frac{z(z - \cos(2\pi fT))}{z^2 - 2z\cos(2\pi fT) + 1} \quad (87)$$

An interpretation of equations (86) and (87) as impulse response to a signal given by:

$$x(k) = \begin{cases} 1, k = 0 \\ 0, k \neq 0 \end{cases} \quad (88)$$

leads to the following relations for the sine signal:

$$y(k) = \sin(2\pi fkT) = x(k-1)\sin(2\pi fT) + 2y(k-1)\cos(2\pi fT) - y(k-2) \quad (89)$$

and $$y(k) = \cos(2\pi fkT) = x(k) + \cos(2\pi fkt)x(k-1) + 2y(k-1)\cos(2\pi fT) - y(k-2) \quad (90)$$

An expression for a phase shifted sine signal can be derived by using the following equation:

$$\sin(a+b) = \sin(a)\cos(b) + \cos(a)\sin(b) \quad (91)$$

Setting $a = 2\pi fkT$ and $b = \phi$ and transforming the result in the z-domain using equations (86) and (87) leads to:

$$\sin(2\pi fkT + \varphi) \rightarrow \frac{z^2\sin\varphi + z(\sin(2\pi fT)\cos\varphi - \cos(2\pi fT)\sin\varphi)}{z^2 - 2z\cos(2\pi fT) + 1} \quad (92)$$

and finally to $$\begin{aligned} y(k) &= \sin(2\pi fkT + \varphi) \\ &= x(k) \cdot \sin\varphi + x(k-1) \cdot (\sin(2\pi fT)\cos\varphi - \\ &\quad \cos(2\pi fT)\sin\varphi) + 2y(k-1) \cdot \cos(2\pi fT) - y(k-2) \end{aligned} \quad (93)$$

Note that all multiplication factors are constant values and only have to be calculated once when the simulation starts.

A frequency shift of the indirect signal is obtained by multiplexing it with a complex sine signal. The noise signal is generated as a sum of two independent Gaussian noise processes with the same variance for the real and imaginary component.

Simulation Results for an Indirect Non Shifted Signal

In this simulation, no direct path signal is generated and the Doppler shift is set to zero. The parameter is the Doppler spread which appears at different mobile speeds in this particular environment. Results are shown in FIG. 11.

Simulation Results for a Direct Shifted Signal

This simulation is performed without any indirect signal so the received signal only consists of a direct path components and noise. The parameter is the frequency shift. Results are shown in FIG. 12.

Simulation Results for a Superposed Direct and Indirect Signal

This simulation assumes a superposition of a direct path and a reflected component of the same power. The reflected component has no Doppler shift and a Doppler spread of 200

Hz. The indirect path's Doppler shift is used as parameter in this simulation and is the range from 0 to 200 Hz. The existence of a direct component decreases the estimation of the Doppler shift to a certain degree, in particular when the direct component appears in the center of the spectrum of the reflected component. Results are shown in FIG. 13.

The invention claimed is:

1. A method for Doppler spread estimation for a radio signal transmission channel in a mobile communications environment on the basis of a radio signal (c) transmitted via the transmission channel, the method comprising the steps of:

determining an autocorrelation function ($\phi_{cc}(t)$) for the radio signal (c);

defining a Doppler spread ($B^{(2)}$) for the radio signal (c) as a function in time of the autocorrelation function ($\phi_{cc}(t)$) and its first and second derivatives for a point of time being zero;

determining the autocorrelation function ($\phi_{cc}(0)$) for the point of time being zero;

estimating the first derivative of the autocorrelation function ($\phi_{cc}(0)$) for the point of time being zero, by averaging a first portion of the autocorrelation function ($\phi_{cc}(t)$) including the point of time being zero;

estimating the second derivative of the autocorrelation function ($\phi_{cc}(0)$) for the point of time being zero by averaging a second portion of the autocorrelation function ($\phi_{cc}(t)$) including the point of time being zero; and estimating the Doppler spread ($B^{(2)}$) for the transmission channel by evaluating the Doppler spread function using the autocorrelation function ($\phi_{cc}(0)$) as determined for the point of time being zero and the first and second derivatives ($\phi_{cc}(0)$, $\phi_{cc}(0)$) of the autocorrelation function as estimated for the point of time being zero.

2. The method according to claim 1, wherein determining of the autocorrelation function ($\phi_{cc}(t)$) comprises the steps of:

modelling the radio signal (c) as a time discrete signal; and determining an autocorrelation sequence ($r_{cc}(n)$) on the basis of the time discrete signal characterizing the radio signal (c).

3. The method according to claim 2, wherein the step of determining the autocorrelation function ($\phi_{cc}(t)$) comprises the steps of:

defining a correlation influence length (L) for the autocorrelation function ($\phi_{cc}(t)$); and determining a recursive function for recursively determining coefficients of the autocorrelation sequence ($r_{cc}(n)$).

4. The method according to claim 3, wherein the step of determining the recursive function comprises the step of:

determining the recursive function by exponentially averaging of the autocorrelation sequence ($r_{cc}(n)$).

5. The method according to claim 2, wherein, for the step of estimating the first and second derivatives ($\phi_{cc}(0)$, $\phi_{cc}(0)$) of the autocorrelation function, discrete autocorrelation coefficients of the autocorrelation sequence ($r_{cc}(n)$ are used.

6. The method according to claim 5, wherein, for the step of estimating the first and second derivatives ($\phi_{cc}(0)$, $\phi_{cc}(0)$) of the autocorrelation function, a first autocorrelation coefficient ($r_{cc}^{(1)}$) and a second autocorrelation coefficient ($r_{cc}(K)$) of the autocorrelation sequence ($r_{cc}(u)$ are used.

7. The method according to claim 6, wherein the second autocorrelation coefficient ($r_{cc}(K)$) is determined in dependence of the correlation influence length (L).

8. The method according to claim 6, further comprising the steps of:

defining a threshold value ($SNR_{thr}$) for a signal to noise ratio;

defining a signal to noise ratio ($SNR_{lag}$) for the estimated second derivative ($\phi_{cc}(t)$) of the autocorrelation function;

determining the signal to noise ratio ($SNR_{lag}$) for the estimated second derivative ($\phi_{cc}(t)$) of the autocorrelation function on the basis of autocorrelation coefficients ($r_{cc}(1)$, $r_{cc}(K)$) for the autocorrelation sequence ($r_{cc}(n)$; and determining an autocorrelation coefficient as the second autocorrelation coefficient ($r_{cc}(K)$) for which the determined signal to noise ratio ($SNR_{lag}$) is below the defined signal to noise ration threshold value ($SNR_{thr}$).

9. The method according to claim 1, wherein the step of estimating the first derivative ($\phi_{cc}(0)$) of the autocorrelation function for the point of time being zero comprises the step of:

determining the slope of the autocorrelation function ($\phi_{cc}(t)$) for the point of time being zero.

10. The method according to claim 9, wherein determining the slope of the autocorrelation function ($\phi_{cc}(t)$) comprises the steps of:

defining a first point of time (−1, 5T; −T; −T/2) being negative;

defining a second point of time (T/2; T; 1,5T) being positive;

determining respective values of the autocorrelation function ($\phi_{cc}(t)$) for the first and second points of time; and determining a respective one of the slopes of the autocorrelation function ($\phi_{cc}(t)$) on the basis of the determined respective values of the autocorrelation function ($\phi_{cc}(t)$) for the first and second points of time in relation to a time interval defined by the first and second points of time.

11. The method according to claim 10, further comprising the step of:

defining the first and second points of time respectively for each slope of the autocorrelation function ($\phi_{cc}(t)$) used for the estimating of its first and second derivatives ($\phi_{cc}(0)$, ($\phi_{cc}(0)$) for the point of time being zero such that the estimating of the first and second derivatives ($\phi_{cc}(0)$, ($\phi_{cc}(0)$) of the autocorrelation function is based on two values of the autocorrelation function ($\phi_{cc}(t)$), whereby the estimating of the Doppler spread ($B^{(2)}$) for the transmission channel is performed by using the two values of the autocorrelation function ($\phi_{cc}(t)$).

12. The method according to claim 1, wherein the step of estimating the second derivative ($\phi_{cc}(0)$) of the autocorrelation function for the point of time being zero comprises the step of:

determining the slope of the first derivative ($\phi_{cc}(t)$) of the autocorrelation function for the point of time being zero, wherein values of the first derivative ($\phi_{cc}(t)$) of the autocorrelation function used for the estimating of the slope thereof are determined by determining the slope of respective portions of the autocorrelation function ($\phi_{cc}(t)$).

13. The method according to claim 1, wherein the steps of estimating the first and second derivatives ($\phi_{cc}(0)$, ($\phi_{cc}(0)$) of the autocorrelation function each include the step of:

estimating on the basis of portions of the autocorrelation function ($\phi_{cc}(t)$) being unaffected by signal noise (n) of the radio signal (c).

14. The method according to claim 13, further comprising the step of:

estimating the first and second derivatives ($\phi_{cc}(0)$, ($\phi_{cc}(0)$)), of the autocorrelation function for the point of time being zero on the basis of values for the autocorrelation function ($\phi_{cc}(t)$) not including the value of the autocorrelation function ($\phi_{cc}(0)$) for the point of time being zero.

15. The method according to claim 1, further comprising the steps of:

receiving the radio signal (c);
demodulating the received radio signal (c) with a predefined signal sequence ($n_p$, $n_s$); and
determining the autocorrelation function ($\phi_{cc}(t)$) as autocorrelation for the demodulated radio signal (y).

16. The method according to claim 15, wherein the autocorrelation function ($\phi_{yy}(t)$) for the demodulated radio signal (y) is defined by an autocorrelation sequence $r_{yy}(n)$ for the demodulated radio signal (y).

17. The method according to claim 16, wherein the autocorrelation sequence is defined by an autocorrelation sequence ($r_{xx}(n)$) for demodulated radio signal portions (x) representing the predefined signal sequence ($n_p$, $n_s$).

18. The method according to claim 17, wherein autocorrelation coefficients for the demodulated radio signal portions (x) are determined on the basis of an averaging process for respective autocorrelation coefficients ($r_{yy}(n)$) for the demodulated radio signal (y) by means of recursive function.

19. The method according to claim 18, wherein the averaging process is performed in dependence on a percentage of the predefined signal sequence ($u_p$, $u_s$) with respect to the de-modulated radio signal (y).

20. The method according to claim 1, wherein the transmission channel is a DPCCH channel of a mobile telephone environment, wherein the radio signal (c) comprises at least one frame having subsequent slots each thereof including a number of predefined pilot symbols, the method further comprising the steps of:

demodulating the radio signal (c) to obtain demodulated pilot symbols per slots ($x(n_p)$);
determining the autocorrelation function on the basis of autocorrelation coefficients ($r_{xx}(n)$) of anautocorrelation sequence determined for the demodulated pilot symbols ($x(u_p)$);
estimating the first and second derivatives ($\phi_{cc}(t)$, ($\phi_{cc}(t)$) of the autocorrelation function in dependence, of autocorrelation coefficients ($r_{xx}(n)$ for the demodulated pilot symbols ($x(n_p)$); and
estimating the Doppler spread ($B^{(2)}$) by evaluating the Doppler spread function by using the demodulated pilot symbol autocorrelation coefficients ($r_{xx}(n)$).

* * * * *